(12) United States Patent
Kyono

(10) Patent No.: US 7,944,085 B2
(45) Date of Patent: May 17, 2011

(54) MULTIPLE OUTPUT SWITCHING POWER SOURCE APPARATUS INCLUDING MULTIPLE SERIES RESONANT CIRCUITS

(75) Inventor: Yoichi Kyono, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 281 days.

(21) Appl. No.: 12/089,054

(22) PCT Filed: Oct. 3, 2006

(86) PCT No.: PCT/JP2006/319794
§ 371 (c)(1),
(2), (4) Date: Apr. 3, 2008

(87) PCT Pub. No.: WO2007/040227
PCT Pub. Date: Apr. 12, 2007

(65) Prior Publication Data
US 2009/0256423 A1  Oct. 15, 2009

(30) Foreign Application Priority Data

Oct. 3, 2005 (JP) .............................. P2005-289934
Feb. 21, 2006 (JP) .............................. P2006-044321

(51) Int. Cl.
*H02J 3/14* (2006.01)
(52) U.S. Cl. .............. 307/31; 323/267; 363/12; 363/18; 363/97; 363/98; 363/21.02; 363/21.03; 363/21.04; 363/21.1; 363/21.12
(58) Field of Classification Search .......................... None
See application file for complete search history.

(56) References Cited

U.S. PATENT DOCUMENTS 5,386,359 A * 1/1995 Nochi .................... 363/21.02
(Continued)

FOREIGN PATENT DOCUMENTS

JP  63 52671  3/1988
(Continued)

OTHER PUBLICATIONS

English translation of JP 1999/187661 to Usui, Jul. 9, 1999.*

(Continued)

*Primary Examiner* — Fritz M Fleming
*Assistant Examiner* — Justen Fauth
(74) *Attorney, Agent, or Firm* — Oblon, Spivak, McClelland, Maier & Neustadt, L.L.P.

(57) ABSTRACT

A multiple output switching power source apparatus includes first and second switching elements Q1 and Q2, a first series resonant circuit connected in parallel with Q1 or Q2 and having a first current resonant capacitor and a primary winding of a transformer that are connected in series, a first rectifying-smoothing circuit to rectify and smooth a voltage generated by a secondary winding of the transformer, a second series resonant circuit connected in parallel with the secondary winding and having a second current resonant capacitor and a second resonant reactor that are connected in series, a second rectifying-smoothing circuit to rectify and smooth a voltage of the second series resonant circuit, and a control circuit to determine an ON period of Q1 according to a voltage obtained from one of the first and second rectifying-smoothing circuits, determine an ON period of Q2 according to a voltage obtained from the other of the first and second rectifying-smoothing circuits, and alternately turn on/off Q1 and Q2.

14 Claims, 28 Drawing Sheets

U.S. PATENT DOCUMENTS

| | | | |
|---|---|---|---|
| 5,448,465 A * | 9/1995 | Yoshida et al. | 363/15 |
| 5,699,238 A * | 12/1997 | Lee et al. | 363/21.03 |
| 6,587,359 B2 * | 7/2003 | Raets et al. | 363/24 |
| 6,642,630 B2 * | 11/2003 | Watanabe | 307/31 |
| 6,822,881 B2 | 11/2004 | Elferich | |
| 6,839,245 B2 * | 1/2005 | Yasumura | 363/21.02 |
| 6,917,531 B2 * | 7/2005 | Scheel et al. | 363/97 |
| 7,315,460 B2 | 1/2008 | Kyono | |
| 7,339,799 B2 | 3/2008 | Osaka et al. | |
| 7,375,987 B2 | 5/2008 | Kyono | |
| 2005/0068792 A1 * | 3/2005 | Yasumura | 363/21.06 |
| 2005/0157522 A1 * | 7/2005 | Osaka | 363/21.02 |
| 2006/0220591 A1 * | 10/2006 | Marchand et al. | 315/209 R |
| 2007/0138870 A1 | 6/2007 | Kyono | |

FOREIGN PATENT DOCUMENTS

| | | |
|---|---|---|
| JP | 2 285963 | 11/1990 |
| JP | 9-322533  A | 12/1997 |
| JP | 2002 330583 | 11/2002 |
| JP | 2003 259644 | 9/2003 |

OTHER PUBLICATIONS

JP Pg-pub 1999-187661 to Usui—english translation, Jul. 9, 1999.*
U.S. Appl. No. 12/663,290, filed Dec. 7, 2009, Kyono.
U.S. Appl. No. 12/442,824, filed Mar. 25, 2009, Kyono.
U.S. Appl. No. 12/528,461, filed Aug. 25, 2009, Kyono.
U.S. Appl. No. 12/667,973, filed Jan. 6, 2010, Kyono.

* cited by examiner

MULTIPLE OUTPUT SWITCHING POWER SOURCE APPARATUS INCLUDING MULTIPLE SERIES RESONANT CIRCUITS

TECHNICAL FIELD

The present invention relates to a multiple output switching power source apparatus having a plurality of outputs.

BACKGROUND TECHNOLOGY

FIG. 1 is a circuit diagram illustrating the configuration of a resonant-type multiple output switching power source apparatus according to a related art. In this multiple output switching power source apparatus, the primary side of a transformer T1 includes a full-wave rectifying circuit 2 to rectify an AC voltage from a commercial power source 1, a smoothing capacitor C3 connected between output terminals of the full-wave rectifying circuit 2, to smooth an output from the full-wave rectifying circuit 2, a first switching element Q1 and a second switching element Q2 (for example, MOSFETs) that are connected in series between ends of the smoothing capacitor C3, to receive a terminal voltage of the smoothing capacitor C3 as a DC input voltage sin, a control circuit 10 to control ON/OFF of the first switching element Q1 and second switching element Q2, a voltage resonant capacitor Crv connected in parallel with the second switching element Q2, and a series resonant circuit connected to both ends of the voltage resonant capacitor Crv.

The series resonant circuit consists of a primary winding P1 (the number of turns of N1) of the transformer T1, a reactor Lr, and a current resonant capacitor Cri that are connected in series. The reactor Lr is, for example, a leakage inductance between the primary and secondary sides of the transformer T1.

On the secondary side of the transformer T1, a first secondary winding S1 (the number of turns of N2) is wound to generate a voltage whose phase is opposite to the phase of a voltage of the primary winding P1 of the transformer T1, a first rectifying-smoothing circuit is connected to the first secondary winding S1, a second secondary winding S2 (the number of turns of N3) is wound to generate a voltage whose phase is opposite to the phase of the voltage of the primary winding P1 of the transformer T1, and a second rectifying-smoothing circuit is connected to the second secondary winding S2.

The first rectifying-smoothing circuit has a diode D1 and a smoothing capacitor C1, rectifies and smoothes a voltage induced by the first secondary winding S1 of the transformer T1, and outputs a first output voltage Vo1 from a first output terminal. The second rectifying-smoothing circuit has a diode D2 and a smoothing capacitor C2, rectifies and smoothes a voltage induced by the second secondary winding S2 of the transformer T1, and outputs a second output voltage Vo2 from a second output terminal.

This multiple output switching power source apparatus has a feedback circuit 5 to feed back to the primary side a signal corresponding to a voltage generated on the secondary side of the transformer T1. Namely, an input side of the feedback circuit 5 is connected to the first output terminal (Vo1), compares a terminal voltage of the smoothing capacitor C1 with a predetermined reference voltage, and feeds an error voltage as a voltage error signal back to the control circuit 10 on the primary side.

According to the voltage error signal fed back from the feedback circuit 5, the control circuit 10 alternately turns on/off the first switching element Q1 and second switching element Q2 thereby carrying out PWM control of controlling the first output voltage Vo1 to be constant. In this case, gates of the first switching element Q1 and second switching element Q2 receive control signals, i.e., voltages that may set a dead time of about several hundreds of nanoseconds. With this, the first switching element Q1 and second switching element Q2 do not overlap their ON periods with each other and are alternately turned on/off.

Operation of the multiple output switching power source apparatus according to the related art having the above-mentioned configuration will be explained with reference to waveforms illustrated in FIG. 2.

In FIG. 2, $VQ2ds$ is a drain-source voltage of the second switching element Q2, IQ1 a current passing through a drain of the first switching element Q1, IQ2 a current passing through a drain of the second switching element Q2, Icri a current passing through the current resonance capacitor Cri, Vcri a terminal voltage of the current resonant capacitor Cri, ID1 a current passing through the diode D1, VN2 a terminal voltage of the first secondary winding S1, and ID2 a current passing through the diode D2.

The first output voltage Vo1 is controlled by the control circuit 10 that receives the voltage error signal fed back to the primary side from the first rectifying-smoothing circuit through the feedback circuit 5 and carries out PWM control on the first switching element Q1. In this case, the first switching element Q1 and second switching element Q2 are alternately turned on/off with a dead time of about several hundreds of nanoseconds in response to control signals from the control circuit 10, as mentioned above.

First, in an ON period (for example, time t11 to t12) of the first switching element Q1, the current resonant capacitor Cri accumulates energy through an exciting inductance of the primary winding P1 of the transformer T1 and the reactor Lr (leakage inductance between the primary and secondary sides of the transformer T1).

Next, in an ON period (for example, time t12 to t14) of the second switching element Q2, the energy accumulated in the current resonant capacitor Cri causes the reactor Lr and current resonant capacitor Cri to pass a resonant current and send energy to the secondary side. Also, the exciting energy of the exciting inductance of the primary winding P1 is reset.

More precisely, in the ON period of the second switching element Q2, the primary winding P1 receives a voltage that is produced by dividing the terminal voltage Vcri of the current resonant capacitor Cri with the exciting inductance of the primary winding P1 and the reactor Lr. When the voltage applied to the primary winding P1 reaches $(Vo1+Vf) \times N1/N2$, it is clamped and the current resonant capacitor Cri and reactor Lr pass a resonant current to send energy to the secondary side. This results in passing the current ID to the diode D1. If the voltage of the primary winding P1 is smaller than $(Vo1+Vf) \times N1/N2$, no energy is transmitted to the secondary side of the transformer T1 and the exciting inductance of the primary winding P1 of the transformer T1, the reactor Lr, and the current resonant capacitor Cri conduct a resonant operation only on the primary side. Here, Vf is a forward voltage drop of the diode.

In general, the ON period of the second switching element Q2 is determined by the ON period of the first switching element Q1 under a fixed frequency, or it is an optional fixed period. Changing the ON period of the first switching element Q1 to change the duty ratios of the first switching element Q1 and second switching element Q2 results in changing the voltage of the current resonant capacitor Cri, and therefore, it is possible to control the quantity of energy to be sent to the secondary side.

The first secondary winding S1 and second secondary winding S2 are coupled with the same polarities. Due to this, while energy provided by the first secondary winding S1 is being output as the first output voltage Vo1 in an ON period of the second switching element Q2, energy provided by the second secondary winding S2 is output as the second output voltage Vo2. This second output voltage Vo2 is nearly equal to Vo1×N3/N2.

DISCLOSURE OF INVENTION

However, in practice, the voltages generated by the first secondary winding S1 and second secondary winding S2 are higher than the first output voltage Vo1 and second output voltage Vo2 by the forward voltage drops Vf of the diode D1 and diode D2. As a result, a change in Vf due to a load variation at each output may deteriorate a cross regulation. In the case of a power source apparatus that is designed to vary output voltages, changing one output voltage results in causing a proportional change in the other output. Then, it will be impossible to directly take a plurality of outputs from windings.

FIG. 3 is a circuit diagram illustrating the configuration of a multiple output switching power source apparatus according to another related art. This multiple output switching power source apparatus employs, instead of the second rectifying-smoothing circuit illustrated in FIG. 1, a regulator 12 such as a dropper and a step-down chopper. The regulator 12 is used to generate a second output voltage Vo2 from a first output voltage Vo1 so that the outputs are stabilized. This multiple output switching power source apparatus can solve the cross regulation problem related to two outputs. However, the regulator 12 increases a loss, the additional parts including switching elements, choke coils, control ICs, and the like increase the cost and a packaging space, and the switching regulator such as a step-down chopper causes noise.

As a multiple output switching power source apparatus, Japanese Unexamined Patent Application Publication No. 2003-259644 discloses a switching converter circuit with one converter stabilizing two kinds of voltage. This switching converter circuit arranges a second switching element as an active snubber, controls ON/OFF of a first switching element to stabilize a first output, and in an OFF period of the first switching element, controls ON/OFF of the second switching element to stabilize a second output. This switching converter circuit can stabilize two kinds of output with one converter. However, a secondary winding to provide the first output and a secondary winding to provide the second output must have opposite polarities. Namely, two secondary windings are needed.

As mentioned above, the multiple output switching power source apparatuses according to the related arts have the problem of worsening a cross regulation due to load variations at each output and the problem of not directly taking a plurality of outputs from windings in the case of the power source designed to provide variable output voltages. The technique of arranging a regulator on the secondary side to solve the problem of cross regulation worsens a loss due to the regulator, increases the cost and a packaging space due to additional parts, and causes noise due to the regulator. The switching converter circuit disclosed in the above related art needs a plurality of secondary windings for a transformer, to thereby cause a problem of complicating the structure.

Means to Solve the Problems

The present invention can provide a multiple output switching power source apparatus capable of stabilizing a plurality of outputs even if there are load variations.

According to a first technical aspect of the present invention, a multiple output switching power source apparatus includes a first switching element and a second switching element that are connected in series between output terminals of a DC power source, a first series resonant circuit connected in parallel with the first switching element or the second switching element and having a first current resonant capacitor, a first resonant reactor, and a primary winding of a transformer that are connected in series, a first rectifying-smoothing circuit to rectify and smooth a voltage generated by a secondary winding of the transformer, a second series resonant circuit connected in parallel with the secondary winding of the transformer and having a second current resonant capacitor and a second resonant reactor that are connected in series, a second rectifying-smoothing circuit to rectify and smooth a voltage of the second series resonant circuit, and a control circuit to determine an ON period of the first switching element according to a voltage obtained from any one of the first rectifying-smoothing circuit and second rectifying-smoothing circuit, determine an ON period of the second switching element according to a voltage obtained from the other of the first rectifying-smoothing circuit and second rectifying-smoothing circuit, and alternately turn on/off the first switching element and second switching element.

According to a second technical aspect of the present invention, the multiple output switching power source apparatus is further characterized in that the secondary winding of the transformer has a first secondary winding and a second secondary winding, the first rectifying-smoothing circuit rectifies and smoothes a voltage generated by the first secondary winding of the transformer, and the second series resonant circuit is connected in parallel with the second secondary winding.

According to a third technical aspect of the present invention, the multiple output switching power source apparatus is further characterized in that the first secondary winding and second secondary winding of the transformer are loosely coupled with each other.

According to a fourth technical aspect of the present invention, the multiple output switching power source apparatus includes, in addition to the first technical aspect, a second transformer having a primary winding and a secondary winding. The second resonant reactor of the second series resonant circuit has the primary winding of the second transformer and the second rectifying-smoothing circuit rectifies and smoothes a voltage generated by the secondary winding of the second transformer.

According to a fifth technical aspect of the present invention, the multiple output switching power source apparatus includes, in addition to the first technical aspect, a second transformer having a plurality of secondary windings. The second reactor is included in a primary winding of the second transformer and the second rectifying-smoothing circuit rectifies and smoothes voltages generated by the plurality of secondary windings of the second transformer.

According to a sixth technical aspect of the present invention, the secondary winding of the first transformer has a first secondary winding and a second secondary winding, the first rectifying-smoothing circuit rectifies and smoothes a voltage generated by the first secondary winding of the first transformer, and the second series resonant circuit is connected in parallel with the second secondary winding of the first transformer.

According to a seventh technical aspect of the present invention, a multiple output switching power source apparatus includes a first switching element and a second switching element that are connected in series between output terminals of a DC power source, a first series resonant circuit in which a first current resonant capacitor, a first resonant reactor, and a primary winding of a first transformer are connected in series and which is connected in parallel with the first switching element or the second switching element, a second series resonant circuit in which a second current resonant capacitor, a second resonant reactor, and a primary winding of a second transformer are connected in series and which is connected in parallel with the first series resonant circuit, a first rectifying-smoothing circuit to rectify and smooth a voltage generated by a secondary winding of the first transformer, a second rectifying-smoothing circuit to rectify and smooth a voltage generated by a secondary winding of the second transformer, and a control circuit to determine an ON period of the first switching element according to a voltage obtained from any one of the first rectifying-smoothing circuit and second rectifying-smoothing circuit, determine an ON period of the second switching element according to a voltage obtained from the other of the first rectifying-smoothing circuit and second rectifying-smoothing circuit, and alternately turn on/off the first switching element and second switching element.

BEST MODE OF IMPLEMENTING INVENTION

Multiple output switching power source apparatuses according to embodiments of the present invention will be explained in detail with reference to the drawings. In the following explanation, the same or corresponding parts as those of the multiple output switching power source apparatus explained in "BACKGROUND TECHNOLOGY" will be represented with the same reference marks as those used therein.

Embodiment 1

Figure 1:
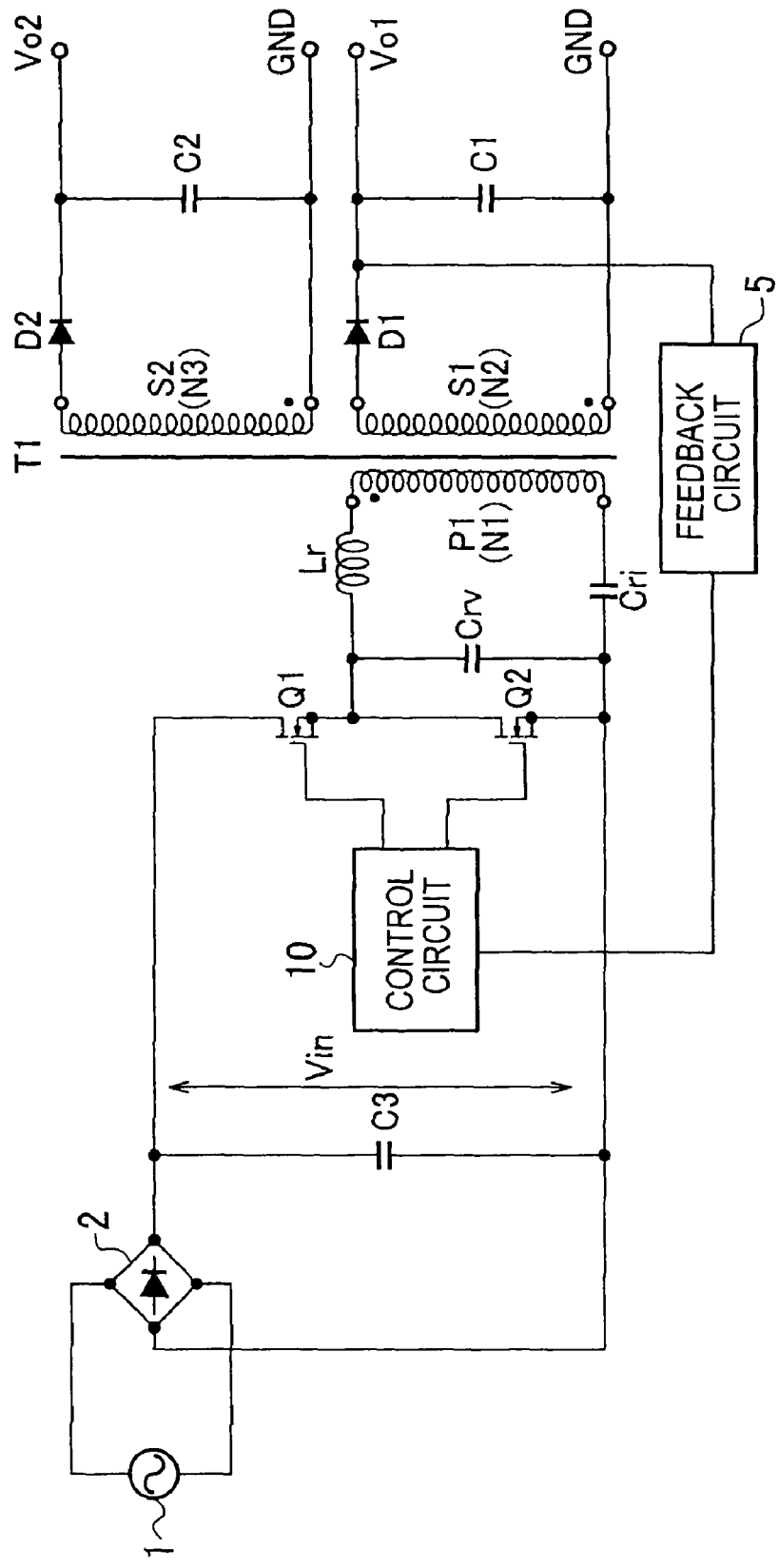
FIG. 1 is a circuit diagram illustrating the configuration of a multiple output switching power source apparatus according to a related art.
Figure 2:
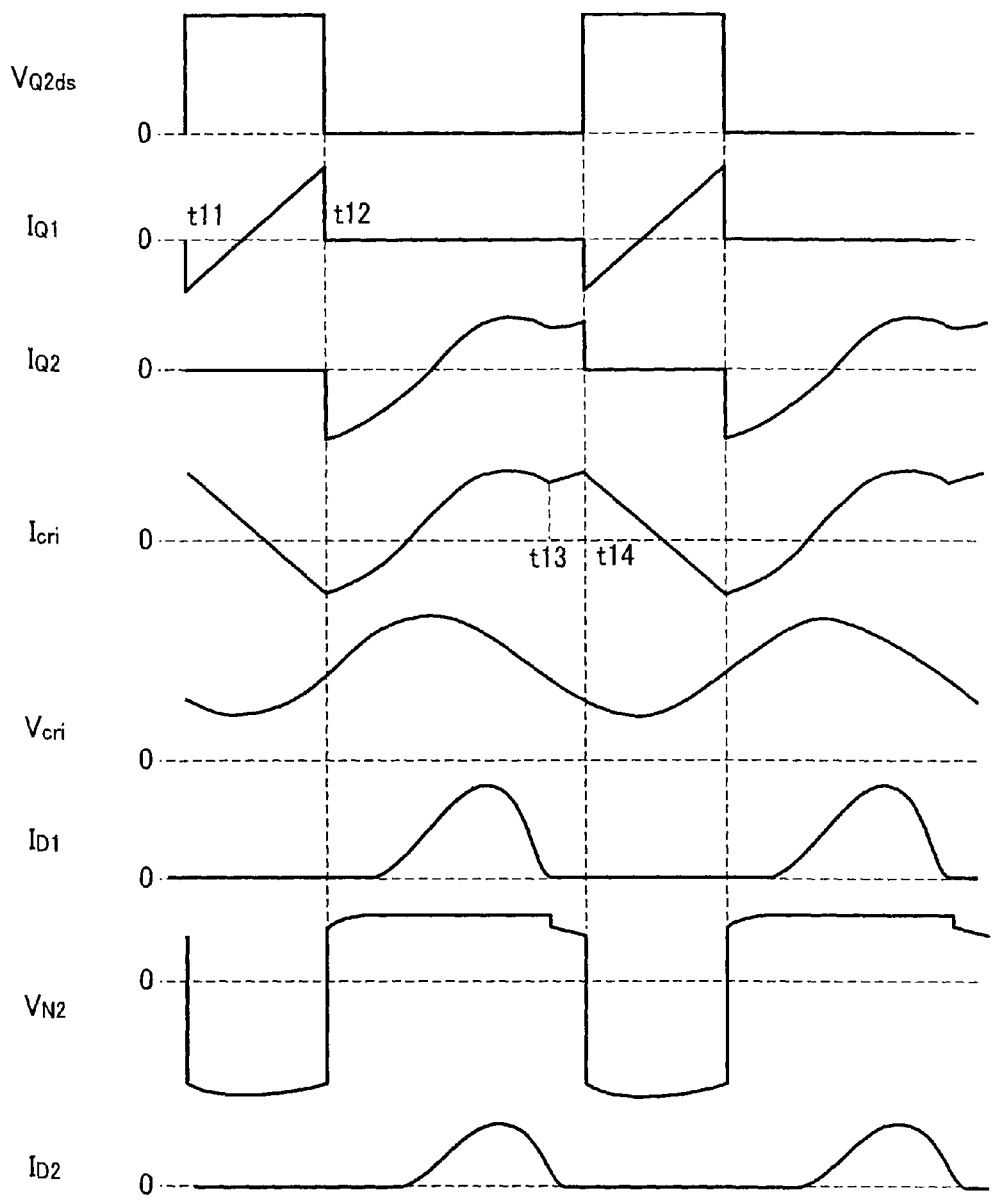
FIG. 2 is a waveform diagram illustrating operation of the multiple output switching power source apparatus according to the related art.
Figure 3:
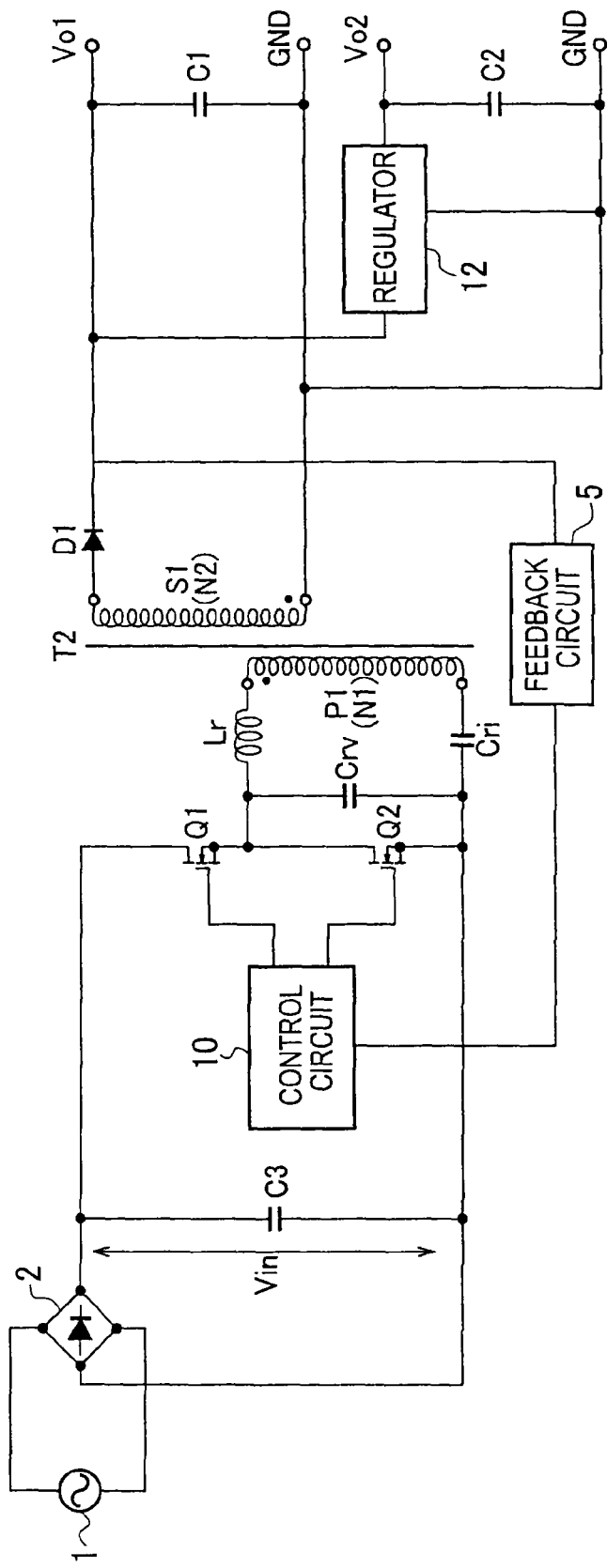
FIG. 3 is a circuit diagram illustrating the configuration of a multiple output switching power source apparatus according to another related art.
Figure 4:
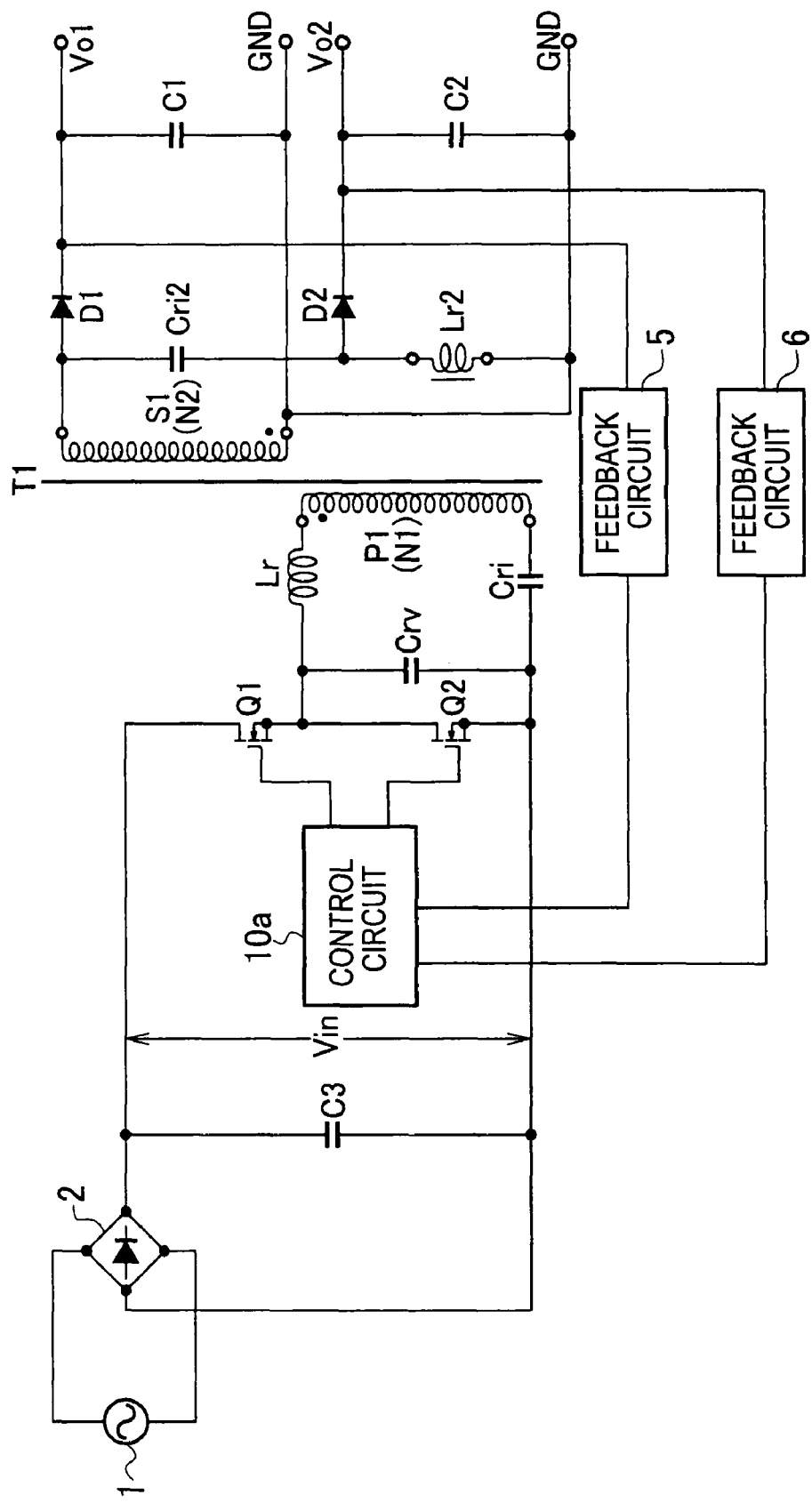
FIG. 4 is a circuit diagram illustrating the configuration of a multiple output switching power source apparatus according to an embodiment 1 of the present invention.

FIG. 4 is a circuit diagram illustrating the configuration of a multiple output switching power source apparatus according to the embodiment 1 of the present invention. In this multiple output switching power source apparatus, the primary side of a transformer T1 includes a full-wave rectifying circuit 2 to rectify an AC voltage from a commercial power source 1, a smoothing capacitor C3 connected between output terminals of the full-wave rectifying circuit 2, to smooth an output from the full-wave rectifying circuit 2, a first switching element Q1 and a second switching element Q2 that are connected in series between both ends of the smoothing capacitor C3, to receive a terminal voltage of the smoothing capacitor C3 as a DC input voltage Vin, a control circuit 10a to control ON/OFF of the first switching element Q1 and second switching element Q2, a voltage resonant capacitor Crv connected in parallel with the second switching element Q2, and a first series resonant circuit connected to both ends of the voltage resonant capacitor Crv. The first switching element Q1 and second switching element Q2 are, for example, MOSFETs.

The first series resonant circuit has a primary winding P1 (the number of turns of N1) of the transformer T1, a first resonant reactor Lr, and a first current resonant capacitor Cri those are connected in series. The first resonant reactor Lr is, for example, a leakage inductance between the primary and secondary sides of the transformer T1.

On the secondary side of the transformer T1, a first rectifying-smoothing circuit is connected to a secondary winding S1 (the number of turns of N2) that is wound to generate a voltage whose phase is opposite to the phase of a voltage of the primary winding P1 of the transformer T1, a second series resonant circuit is connected in parallel with the secondary winding S1, and a second rectifying-smoothing circuit is connected to the second series resonant circuit.

The first rectifying-smoothing circuit has a diode D1 and a smoothing capacitor C1. An anode of the diode D1 is connected to a first end of the secondary winding S1 and a cathode thereof is connected to a first output terminal. The smoothing capacitor C1 is connected between the cathode of the diode D1 (the first output terminal) and a second end of the secondary winding S1 (a ground terminal). The first rectifying-smoothing circuit rectifies and smoothes a voltage induced by the secondary winding S1 of the transformer T1 and outputs a first output voltage Vo1 from the first output terminal.

The second series resonant circuit has a second current resonant capacitor Cri2 whose first end is connected to the first end of the secondary winding S1 (the anode of the diode D1) and a second resonant reactor Lr2 connected between a second end of the second current resonant capacitor Cri2 and the second end of the secondary winding S1 (the ground terminal).

The second rectifying-smoothing circuit has a diode D2 and a smoothing capacitor C2. An anode of the diode D2 is connected to a connection point of the second resonant reactor Lr2 and second current resonant capacitor Cri2 and a cathode thereof is connected to a second output terminal. The smoothing capacitor C2 is connected between the cathode of the diode D2 (the second output terminal) and the second end of the secondary winding S1 (the ground terminal). The second rectifying-smoothing circuit rectifies and smoothes a voltage that is the sum of a voltage generated by the secondary winding S1 of the transformer T1 and a terminal voltage of the second current resonant capacitor Cri2 and outputs a second output voltage Vo2 from the second output terminal.

This multiple output switching power source apparatus has a feedback circuit 5 and a feedback circuit 6, to feed voltages generated on the secondary side of the transformer T1 back to the primary side. The feedback circuit 5 compares the first output voltage Vo1 output to the first output terminal with a predetermined reference voltage and feeds an error voltage as a first voltage error signal back to the control circuit 10a on the primary side. The feedback circuit 6 compares the second output voltage Vo2 output to the second output terminal with a predetermined reference voltage and feeds an error voltage as a second voltage error signal back to the control circuit 10a on the primary side.

Based on the first voltage error signal from the feedback circuit 5 and the second voltage error signal from the feedback circuit 6, the control circuit 10a alternately turns on/off the first switching element Q1 and second switching element Q2, to carry out PWM control so that the first output voltage Vo1 and second output voltage Vo2 remain constant. In this case, gates of the first switching element Q1 and second switching element Q2 receive voltages as control signals that create a dead time of about several hundreds of nanoseconds. As a result, the first switching element Q1 and second switching element Q2 alternately turn on/off without overlapping their ON periods with each other.

Next, operation of the multiple output switching power source apparatus according to the embodiment 1 of the present invention having the above-mentioned configuration will be explained with reference to waveforms illustrated in FIG. 5.

Figure 5:
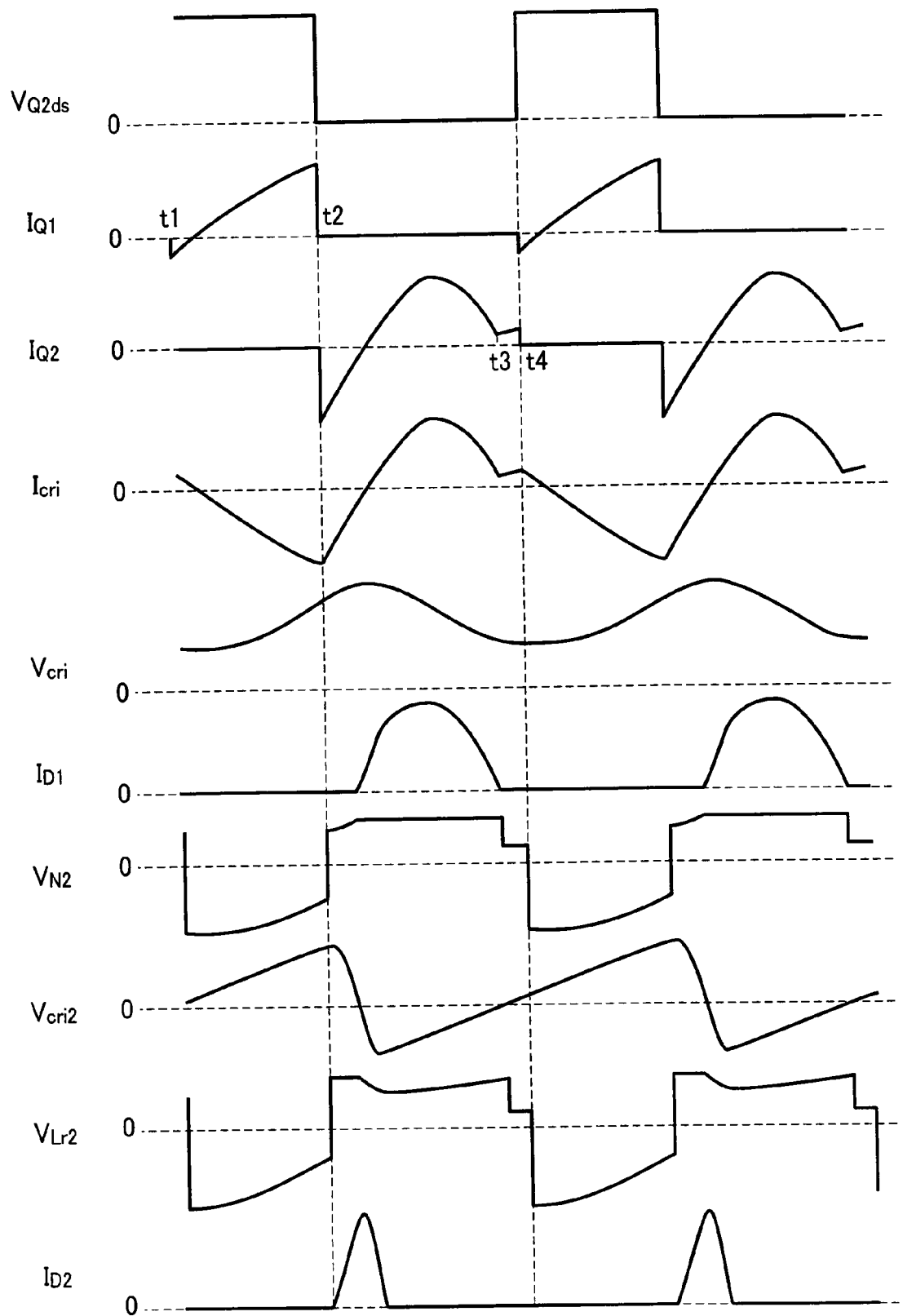
FIG. 5 is a waveform diagram illustrating operation of the multiple output switching power source apparatus according to the embodiment 1 of the present invention.

In FIG. 5, VQ2$ds$ is a drain-source voltage of the second switching element Q2, IQ1 a current passing through a drain of the first switching element Q1, IQ2 a current passing through a drain of the second switching element Q2, Icri a current passing to the first current resonant capacitor Cri, Vcri a terminal voltage of the first current resonant capacitor Cri, ID1 a current passing through the diode D1, VN2 a terminal voltage of the secondary winding S1, Vcir2 a terminal voltage of the second current resonant capacitor Cri2, VLr2 a terminal voltage of the second resonant reactor Lr2, and ID2 a current passing to the diode D2.

Control of the first output voltage Vo1 is carried out, like the multiple output switching power source apparatus of the related art, by controlling duties of the first switching element Q1 and second switching element Q2. Namely, by changing ON-period duty ratios of the first switching element Q1 and second switching element Q2, a voltage stored in the first current resonant capacitor Cri during an ON period of the first switching element Q1 is adjusted, and in an ON period of the second switching element Q2, energy accumulated in the first current resonant capacitor Cri makes the first resonant reactor Lr and first current resonant capacitor Cri resonate. As a result, a resonant current passes to transmit energy to the secondary side of the transformer T1, and therefore, it is possible to control the energy to be transmitted to the secondary side. A voltage generated by the secondary winding S1 is rectified and smoothed by the first rectifying-smoothing circuit having the diode D1 and smoothing capacitor C1, to output the first output voltage Vo1 from the first output terminal.

Control of the second output voltage Vo2 will be explained. In an ON period (for example, time t1 to t2) of the first switching element Q1, a differential voltage between an input voltage Vin and a terminal voltage of the first current resonant capacitor Cri is applied to the primary winding P1, and therefore, the secondary winding S1 generates a voltage that is the differential voltage multiplied by a turn ratio. The voltage generated by the secondary winding S1 is applied to the second series resonant circuit having the second current resonant capacitor Cri2 and second resonant reactor Lr2, so that the second series resonant circuit resonates to gradually charge the second current resonant capacitor Cri2.

In an ON period (for example, time t2 to t4) of the second switching element Q2, a voltage obtained by adding a voltage corresponding to energy accumulated in the second current resonant capacitor Cri2 to a voltage generated by the secondary winding S1 is rectified and smoothed through the second rectifying-smoothing circuit having the diode D2 and smoothing capacitor C2, to output the second output voltage Vo2 from the second output terminal. At this time, the second current resonant capacitor Cri2 is discharged to reduce the voltage corresponding to the accumulated energy, and thereafter, is charged by a current in a reverse direction due to the voltage of the secondary winding S1. When the charging of the smoothing capacitor C2 ends, the diode D2 passes no current and the second current resonant capacitor Cri2 gradually discharges due to a resonant operation with the second resonant reactor Lr2 and is then charged by a current in a reverse direction. During this operation, the second switching element Q2 turns off and the first switching element Q1 turns on, so that the secondary winding S1 reversely induces a voltage and the discharging and reverse charging operations continue.

In this way, the second current resonant capacitor Cri2 discharges only during a period in which the second switching element Q2 turns on to charge the smoothing capacitor C2 and is charged during the remaining ON period of the second switching element Q2 and an ON period of the first switching element Q1. Namely, except the period of charging the smoothing capacitor C2, it is charged in most of a switching period of the first switching element Q1 and second switching element Q2. Namely, by changing the switching period, i.e., switching frequency of the first switching element Q1 and second switching element Q2, it is possible to adjust a charging period of the second current resonant capacitor Cri2 and thereby control the second output voltage Vo2.

More precisely, according to the second output voltage error signal provided by the feedback circuit 6, an ON period of the second switching element Q2 is controlled, and according to the first output voltage error signal provided by the feedback circuit 5, an ON period of the first switching element Q1 is controlled, to adjust duties of the first switching element Q1 and second switching element Q2. Namely, the first output voltage error signal determines duties and adjusts the first output voltage, and therefore, controlling an ON period of the second switching element according to the second output voltage error signal results in changing a switching frequency and adjusting the second output voltage.

The above-mentioned multiple output switching power source apparatus according to the embodiment 1 controls an ON period of the second switching element Q2 with the second voltage error signal based on the second output voltage Vo2 and controls an ON period of the first switching element Q1 with the first voltage error signal based on the first output voltage Vo1. As is apparent for a person skilled in the art, the same result will be obtained by controlling an ON period of the second switching element Q2 with the first voltage error signal based on the first output voltage Vo1 and controlling an ON period of the first switching element Q1 with the second voltage error signal based on the second output voltage Vo2.

According to this embodiment, a voltage obtained from one of the first rectifying-smoothing circuit and second rectifying-smoothing circuit is used to determine an ON period of the first switching element and change duties of the first switching element and second switching element, thereby controlling the voltage of the first current resonant capacitor of the first series resonant circuit. Also, a voltage obtained from the other of the first rectifying-smoothing circuit and second rectifying-smoothing circuit is used to determine an ON period of the second switching element and change a switching frequency, thereby controlling energy to be accumulated in the second resonant capacitor of the second series resonant circuit. By controlling an ON period of any one of the first switching element and second switching element, it is possible to adjust output voltages and stabilize the two outputs.

Embodiment 2

Figure 6:
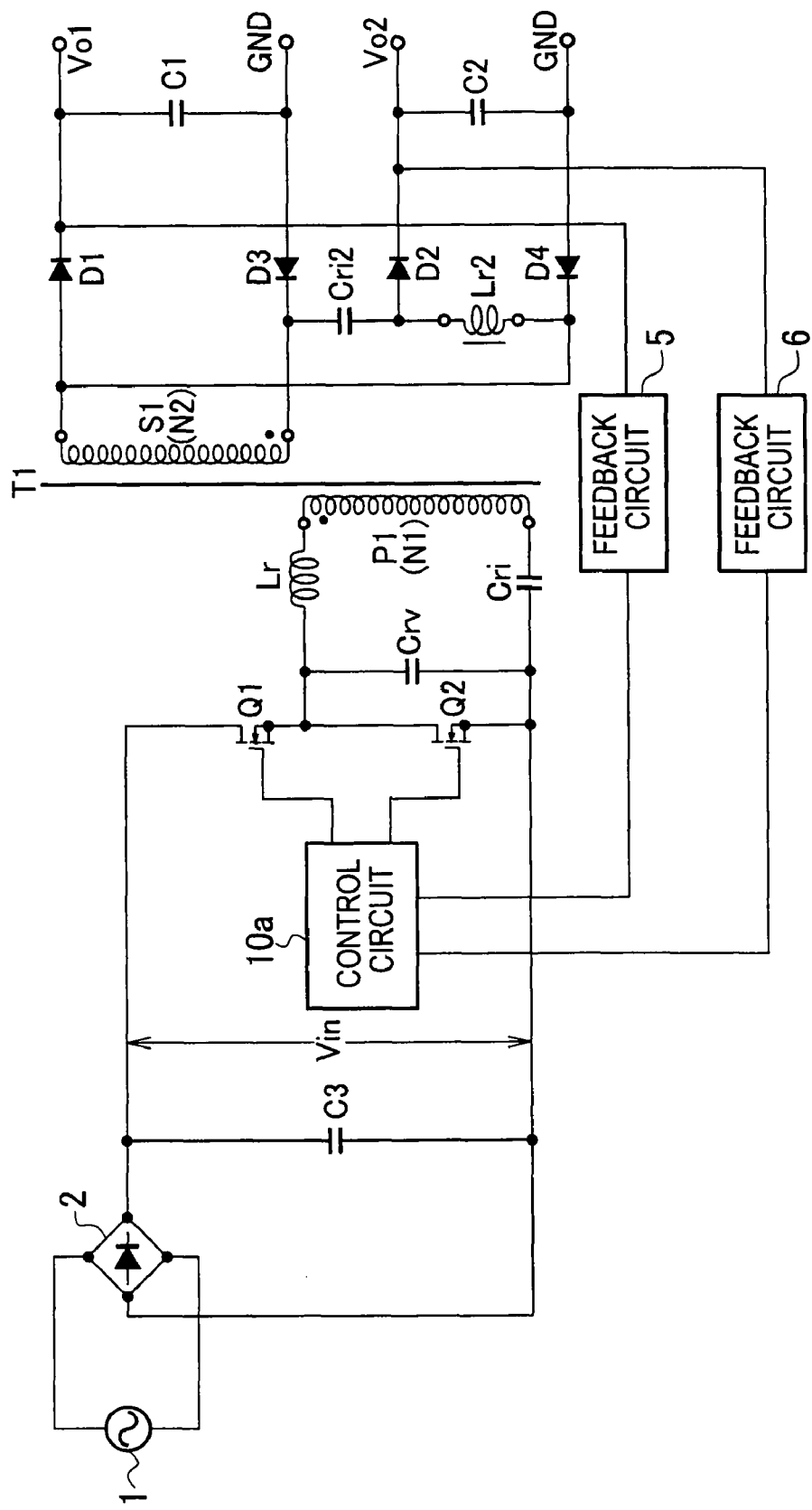
FIG. 6 is a circuit diagram illustrating the configuration of a multiple output switching power source apparatus according to an embodiment 2 of the present invention.

FIG. 6 is a circuit diagram illustrating the configuration of a multiple output switching power source apparatus according to the embodiment 2 of the present invention. This multiple output switching power source apparatus differs from that of the embodiment 1 in the configuration and operation of the secondary side of a transformer T1. In the following, parts that differ from those of the embodiment 1 will mainly be explained.

On the secondary side of the transformer T1, there are arranged a first rectifying-smoothing circuit connected to a secondary winding S1 (the number of turns of N2) that is wound to generate a voltage whose phase is opposite to the phase of a voltage of a primary winding P1 of the transformer T1, a second series resonant circuit connected in parallel with the secondary winding S1, and a second rectifying-smoothing circuit connected to the second series resonant circuit.

The first rectifying-smoothing circuit has a diode D1, a smoothing capacitor C1, and a diode D3. An anode of the diode D1 is connected to a first end of the secondary winding S1 and a cathode thereof is connected to a first output terminal. The smoothing capacitor C1 is connected between the cathode of the diode D1 (the first output terminal) and a ground terminal. An anode of the diode D3 is connected to the ground terminal and a cathode thereof is connected to a second end of the secondary winding S1. The first rectifying-smoothing circuit rectifies and smoothes a voltage induced by the secondary winding S1 of the transformer T1 and outputs a first output voltage Vo1 from the first output terminal.

The second series resonant circuit has a second resonant reactor Lr2 whose first end is connected to the first end of the secondary winding S1 (the anode of the diode D1) and a second current resonant capacitor Cri2 connected between a second end of the second resonant reactor Lr2 and the second end of the secondary winding S1 (the cathode of the diode D3).

The second rectifying-smoothing circuit has a diode D2, a smoothing capacitor C2, and a diode D4. An anode of the diode D2 is connected to a connection point of the second resonant reactor Lr2 and second current resonant capacitor Cri2 and a cathode thereof is connected to a second output terminal. The smoothing capacitor C2 is connected between the cathode of the diode D2 (the second output terminal) and the ground terminal. An anode of the diode D4 is connected to the ground terminal and a cathode thereof is connected to the first end of the secondary winding S1 (the anode of the diode D1). The second rectifying-smoothing circuit rectifies and smoothes the sum of a voltage generated by the secondary winding S1 of the transformer T1 and a terminal voltage of the second current resonant capacitor Cri2 and outputs a second output voltage Vo2 from the second output terminal.

Figure 7:
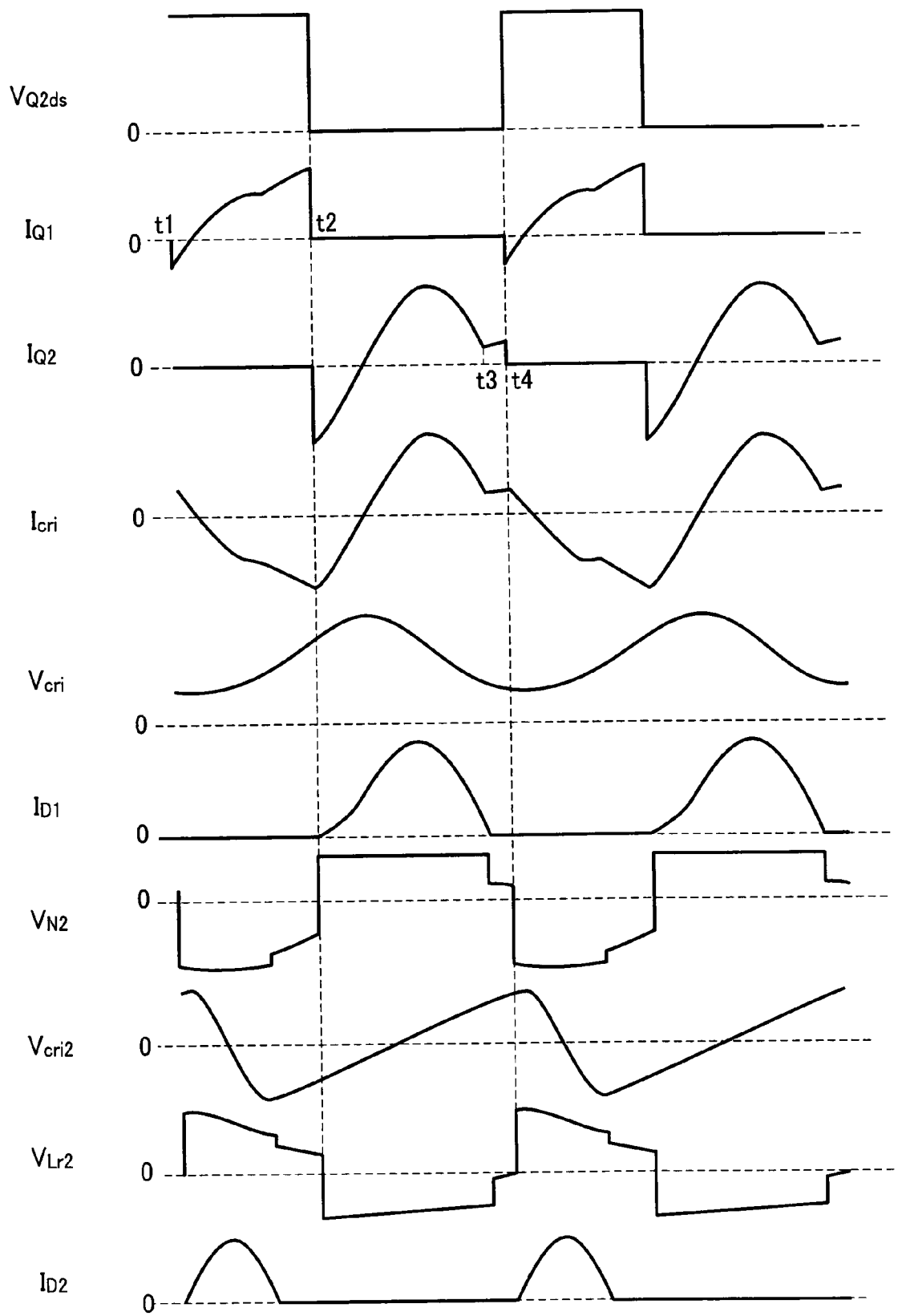
FIG. 7 is a waveform diagram illustrating operation of the multiple output switching power source apparatus according to the embodiment 2 of the present invention.

Operation of the multiple output switching power source apparatus according to the embodiment 2 of the present invention configured as mentioned above will be explained with reference to waveforms illustrated in FIG. 7. The meanings of marks illustrated in FIG. 7 are the same as those of FIG. 5.

Control of the first output voltage Vo1 is carried out, like the multiple output switching power source apparatus of the related art, by controlling the duties of a first switching element Q1 and a second switching element Q2. Namely, by changing the ON-period duty ratios of the first switching element Q1 and second switching element Q2, a voltage stored in a first current resonant capacitor Cri during an ON period of the first switching element Q1 is adjusted, and in an ON period of the second switching element Q2, energy accumulated in the first current resonant capacitor Cri makes a first resonant reactor Lr and the first current resonant capacitor Cri resonate. This results in passing a resonant current through transmit energy to the secondary side. Namely, changing the duty ratios can control the energy to be transmitted to the secondary side. A voltage generated by the secondary winding S1 is rectified and smoothed by the first rectifying-smoothing circuit having the diode D1, diode D3, and smoothing capacitor C1, to output the first output voltage Vo1 from the first output terminal.

Control of the second output voltage Vo2 will be explained. The second series resonant circuit having the second current resonant capacitor Cri2 and second resonant reactor Lr2 has a connection configuration that is opposite to that of the multiple output switching power source apparatus according to the embodiment 1. Namely, in an ON period (for example, time t2 to t4) of the second switching element Q2, a voltage of (Vo1+Vf) generated by the secondary winding S1 is applied to produce a resonant operation that accumulates energy in the second current resonant capacitor Cri2.

In an ON period of the first switching element Q1, a voltage obtained by adding a voltage corresponding to the energy accumulated in the second current resonant capacitor Cri2 to a voltage generated by the secondary winding S1 is rectified and smoothed through the second rectifying-smoothing circuit having the diode D2, smoothing capacitor C2, and diode D4, to output the second output voltage Vo2 from the second output terminal. At this time, the second current resonant capacitor Cri2 generates the voltage corresponding to the energy accumulated therein, and thereafter, is reversely charged by the voltage of the secondary winding S1. When the charging of the smoothing capacitor C2 ends, the diode D2 passes no current and the second current resonant capacitor Cri2 gradually discharges due to a resonant operation with the second resonant reactor Lr2 and is then reversely charged. During this operation, the second switching element Q2 turns off and the first switching element Q1 turns on, so that the secondary winding S1 reversely induces a voltage and the discharging and reverse charging operations continue.

In this way, the second current resonant capacitor Cri2 discharges only during a period in which the second switching element Q2 turns on to charge the smoothing capacitor C2 and is charged during the remaining ON period of the second switching element Q2 and an ON period of the first switching element Q1. Namely, except the period of charging the smoothing capacitor C2, the second current resonant capacitor Cri2 is charged in most of a switching period of the first switching element Q1 and second switching element Q2. Namely, by changing the switching period, i.e., switching frequency of the first switching element Q1 and second switching element Q2, it is possible to adjust the charging period of the second current resonant capacitor Cri2 and thereby control the second output voltage Vo2. More precisely, according to a second output voltage error signal provided by a feedback circuit 6, an ON period of the second switching element Q2 is controlled, and according to a first output voltage error signal provided by a feedback circuit 5, an ON period of the first switching element Q1 is controlled, to adjust duties of the first switching element Q1 and second switching element Q2. Namely, the first output voltage error signal determines the duties and adjusts the first output voltage, and therefore, controlling an ON period of the second switching element according to the second output voltage error signal results in changing the switching frequency and adjusting the second output voltage.

The above-mentioned multiple output switching power source apparatus according to the embodiment 2 controls an ON period of the second switching element Q2 with the second voltage error signal based on the second output voltage Vo2 and controls an ON period of the first switching element Q1 with the first voltage error signal based on the first output voltage Vo1. As is apparent for a person skilled in the art, the same result will be obtained by controlling an ON period of the second switching element Q2 with the first voltage error signal based on the first output voltage Vo1 and controlling an ON period of the first switching element Q1 with the second voltage error signal based on the second output voltage Vo2.

If an input voltage Vin decreases, the first output voltage Vo1 is kept constant by changing the duties of the first switching element Q1 and second switching element Q2 so that the voltage of the first current resonant capacitor Cri is kept constant. As a result, in an ON period of the first switching element Q1, the voltage generated by the secondary winding S1 decreases. To cope with this, the above-mentioned multiple output switching power source apparatus according to the embodiment 2 can decrease the switching frequency if the voltage generated by the secondary winding S1 decreases in an ON period of the first switching element Q1, to thereby control energy to be accumulated in the second current resonant capacitor Cri2, so that, even if an input voltage decreases, constant power may be output to the second output terminal.

This embodiment can adjust, like the embodiment 1, output voltages by controlling any of the first switching element and second switching element, to stabilize the two outputs.

Embodiment 3

Figure 8:
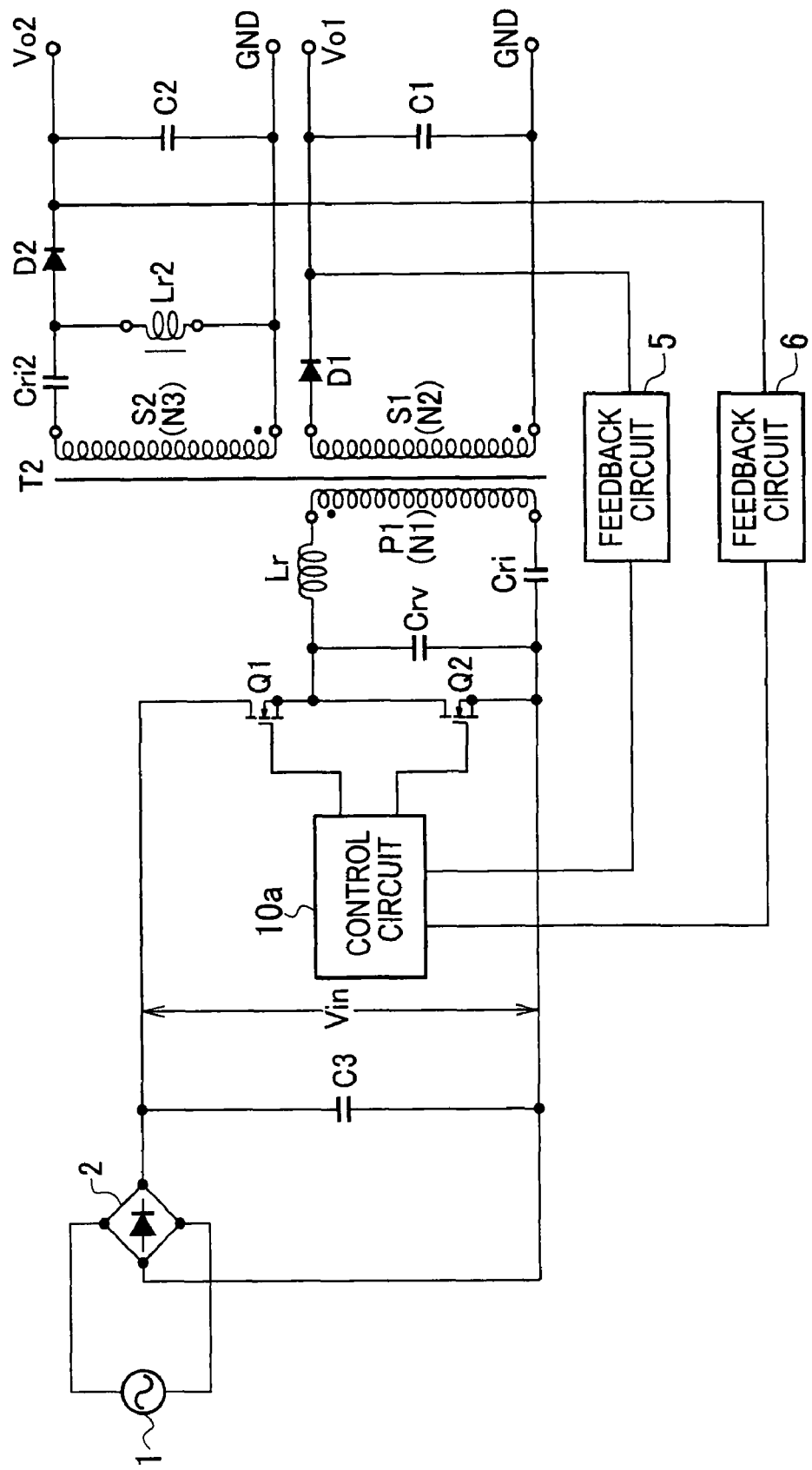
FIG. 8 is a circuit diagram illustrating the configuration of a multiple output switching power source apparatus according to an embodiment 3 of the present invention.

FIG. 8 is a circuit diagram illustrating the configuration of a multiple output switching power source apparatus according to the embodiment 3 of the present invention. This multiple output switching power source apparatus differs from that of the embodiment 1 in the configuration of the secondary side of a transformer. In the following, parts that differ from those of the embodiment 1 will mainly be explained.

The transformer T2 has a first secondary winding S1 (the number of turns of N2) that is wound to generate a voltage whose phase is opposite to the phase of a voltage of a primary winding P1 and a second secondary winding S2 (the number of turns of N3) that is wound to generate a voltage whose phase is opposite to the phase of the voltage of the primary winding P1. The first secondary winding S1 and second secondary winding S2 are wound into a tight coupling. On the secondary side of the transformer T2, there are arranged a first rectifying-smoothing circuit connected to the first secondary winding S1 (the number of turns of N2), a second series resonant circuit connected in parallel with the second secondary winding S2, and a second rectifying-smoothing circuit connected to the second series resonant circuit. The configuration and operation of the first rectifying-smoothing circuit are the same as those of the embodiment 1.

The second series resonant circuit has a second current resonant capacitor Cri2 whose first end is connected to a first end of the second secondary winding S2 and a second resonant reactor Lr2 connected between a second end of the second current resonant capacitor Cri2 and a second end of the second secondary winding S2 (a ground terminal).

The second rectifying-smoothing circuit has a diode D2 and a smoothing capacitor C2. An anode of the diode D2 is connected to a connection point of the second resonant reactor Lr2 and second current resonant capacitor Cri2 and a cathode thereof is connected to a second output terminal. The smoothing capacitor C2 is connected between the cathode of the diode D2 (the second output terminal) and the ground terminal. The second rectifying-smoothing circuit rectifies and smoothes the sum of a voltage generated by the second secondary winding S2 of the transformer T2 and a terminal voltage of the second current resonant capacitor Cri2 and outputs a second output voltage Vo2 from the second output terminal.

Figure 9:
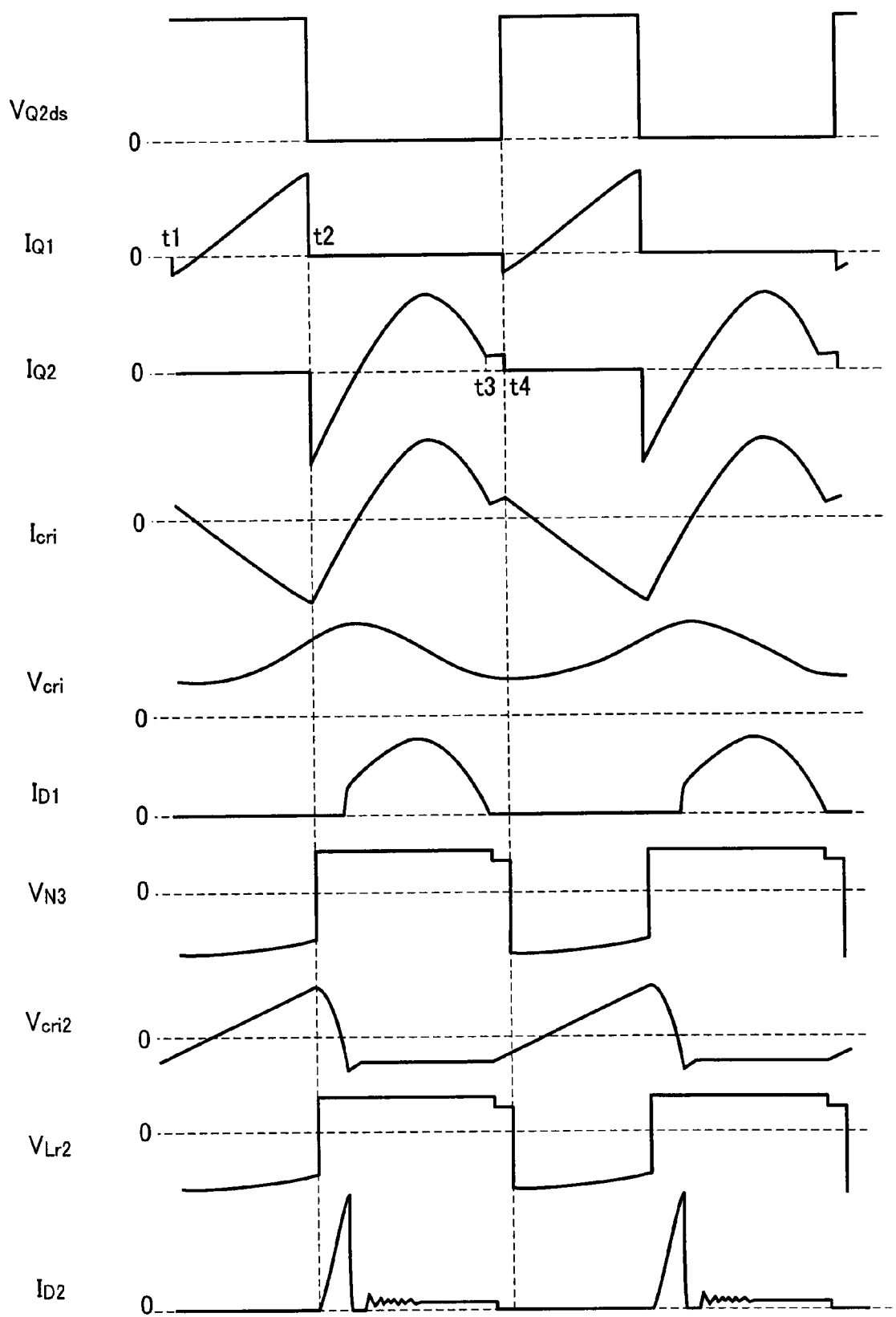
FIG. 9 is a waveform diagram illustrting operation of the multiple output switching power source apparatus according to the embodiment 3 of the present invention.

Operation of the multiple output switching power source apparatus according to the embodiment 3 of the present invention configured as mentioned above will be explained with reference to waveforms illustrated in FIG. 9. The meanings of marks illustrated in FIG. 9 are the same as those of FIG. 5.

Control of the first output voltage Vo1 is carried out, like the multiple output switching power source apparatus of the related art, by controlling the duties of a first switching element Q1 and a second switching element Q2. Namely, by changing ON-period duty ratios of the first switching element Q1 and second switching element Q2, a voltage stored in a first current resonant capacitor Cri during an ON period of the first switching element Q1 is adjusted. As a result, in an ON period of the second switching element Q2, energy accumulated in the first current resonant capacitor Cri makes a first resonant reactor Lr and the first current resonant capacitor Cri resonate and a resonant current passes to transmit energy to the secondary side. Consequently, changing the duty ratios can control the energy to be transmitted to the secondary side. A voltage generated by the first secondary winding S1 is rectified and smoothed by the first rectifying-smoothing circuit having the diode D1 and smoothing capacitor C1, to output the first output voltage Vo1 from the first output terminal.

Control of the second output voltage Vo2 will be explained. Like the multiple output switching power source apparatus according to the embodiment 1, in an ON period (for example, time t1 to t2) of the first switching element Q1, a differential voltage between an input voltage Mm and a terminal voltage of the first current resonant capacitor Cri is applied to the primary winding P1, and therefore, the second secondary winding S2 generates a voltage that is the differential voltage multiplied by a turn ratio. The voltage generated by the second secondary winding S2 is applied to the second series resonant circuit having the second current resonant capacitor Cri2 and second resonant reactor Lr2, so that the second series resonant circuit resonates to gradually charge the second current resonant capacitor Cri2.

In an ON period of the second switching element Q2, a voltage corresponding to energy accumulated in the second current resonant capacitor Cri2 is added to a voltage generated by the second secondary winding S2 and the resultant voltage is rectified and smoothed through the second rectifying-smoothing circuit having the diode D2 and smoothing capacitor C2, to output the second output voltage Vo2 from the second output terminal. At this time, the second current resonant capacitor Cri2 discharges the voltage corresponding to the accumulated energy to once decrease the voltage, and thereafter, is charged by a current in a reverse direction due to the voltage of the secondary winding S2. When the charging of the smoothing capacitor C2 ends, the diode D2 passes no current and the second current resonant capacitor Cri2 gradually discharges due to a resonant operation with the second resonant reactor Lr2 and is then charged in a reverse manner. During this operation, the second switching element Q2 turns off and the first switching element Q1 turns on, so that the secondary winding S2 reversely induces a voltage and the discharging and reverse charging operations continue.

In this way, the second current resonant capacitor Cri2 discharges only during a period in which the second switching element Q2 turns on to charge the smoothing capacitor C2 and is charged during the remaining ON period of the second switching element Q2 and an ON period of the first switching element Q1. Namely, except the period of charging the smoothing capacitor C2, the second current resonant capacitor Cri2 is charged in most of a switching period of the first switching element Q1 and second switching element Q2. Namely, by changing the switching period, i.e., switching frequency of the first switching element Q1 and second switching element Q2, it is possible to adjust the charging period of the second current resonant capacitor Cri2 and thereby control the second output voltage Vo2. More precisely, according to a second output voltage error signal provided by a feedback circuit 6, an ON period of the second switching element Q2 is controlled, and according to a first output voltage error signal provided by a feedback circuit 5, an ON period of the first switching element Q1 is controlled, to adjust duties of the first switching element Q1 and second switching element Q2. Namely, the first output voltage error signal determines the duties and adjusts the first output voltage, and therefore, controlling an ON period of the second switching element according to the second output voltage error signal results in changing the switching frequency and adjusting the second output voltage.

The above-mentioned multiple output switching power source apparatus according to the embodiment 3 controls an ON period of the second switching element Q2 with the second voltage error signal based on the second output voltage Vo2 and controls an ON period of the first switching element Q1 with the first voltage error signal based on the first output voltage Vo1. It is noted that the same result will be obtained by controlling an ON period of the second switching element Q2 with the first voltage error signal based on the first output voltage Vo1 and controlling an ON period of the first switching element Q1 with the second voltage error signal based on the second output voltage Vo2.

If an input voltage Vin decreases, the first output voltage Vo1 is kept constant by changing duties of the first switching element Q1 and second switching element Q2 so that the voltage of the first current resonant capacitor Cri is kept constant. As a result, in an ON period of the first switching element Q1, the voltage generated by the second secondary winding S2 decreases. To cope with this, the above-mentioned multiple output switching power source apparatus according to the embodiment 3 can decrease the switching frequency if the voltage generated by the second secondary winding S2 decreases in an ON period of the first switching element Q1, to thereby control energy to be accumulated in the second current resonant capacitor Cri2, so that, even if an input voltage decreases, constant power may be output to the second output terminal.

At this time, the first secondary winding S1 and second secondary winding S2 are tightly coupled with each other, and therefore, voltages generated by them are clamped at low voltages. As illustrated in waveforms of FIG. 9, periods for sending energy to the first output voltage Vo1 and second output voltage Vo2 are completely separated into individual periods to narrow conduction angles and increase current peaks. To solve this problem, the multiple output switching power source apparatus according to the embodiment 3 may be modified, as illustrated in FIG. 11 for example, to shift the winding positions of the first secondary winding S1 and second secondary winding S2 of the transformer T2 and loosely couple them with each other. This modification may make current changes gentler and suppress current peaks, as illustrated in waveforms of FIG. 10.

To suppress current peaks, there is a configuration of, other than the technique of loosely coupling the first secondary winding S1 and second secondary winding S2 with each other, inserting a first reactor in a line from the second secondary winding S2 to the second rectifying-smoothing circuit, i.e., between the second current resonant capacitor Cri2 and the anode of the diode D2 (before or after a connection point with the second resonant reactor). This configuration provides the same effect as that mentioned above.

The first reactor may be formed by using a leakage inductance to be generated when loosely coupling the first secondary winding and second secondary winding of the transformer T2 with each other. These techniques are applicable to the above-mentioned multiple output switching power source apparatus according to the embodiment 1, to provide the same effect as that mentioned above. Namely, it is possible to widen periods in which currents pass through the first rectifying-smoothing circuit and second rectifying-smoothing circuit and suppress peak currents, thereby reducing losses in the rectifying-smoothing circuits.

Only by adding a few parts to the conventional multiple output switching power source apparatus, this embodiment can, like the invention of the embodiment 1, adjust output voltages by controlling any of ON periods of the first switching element and second switching element and stabilize the two outputs.

Embodiment 4

Figure 12:
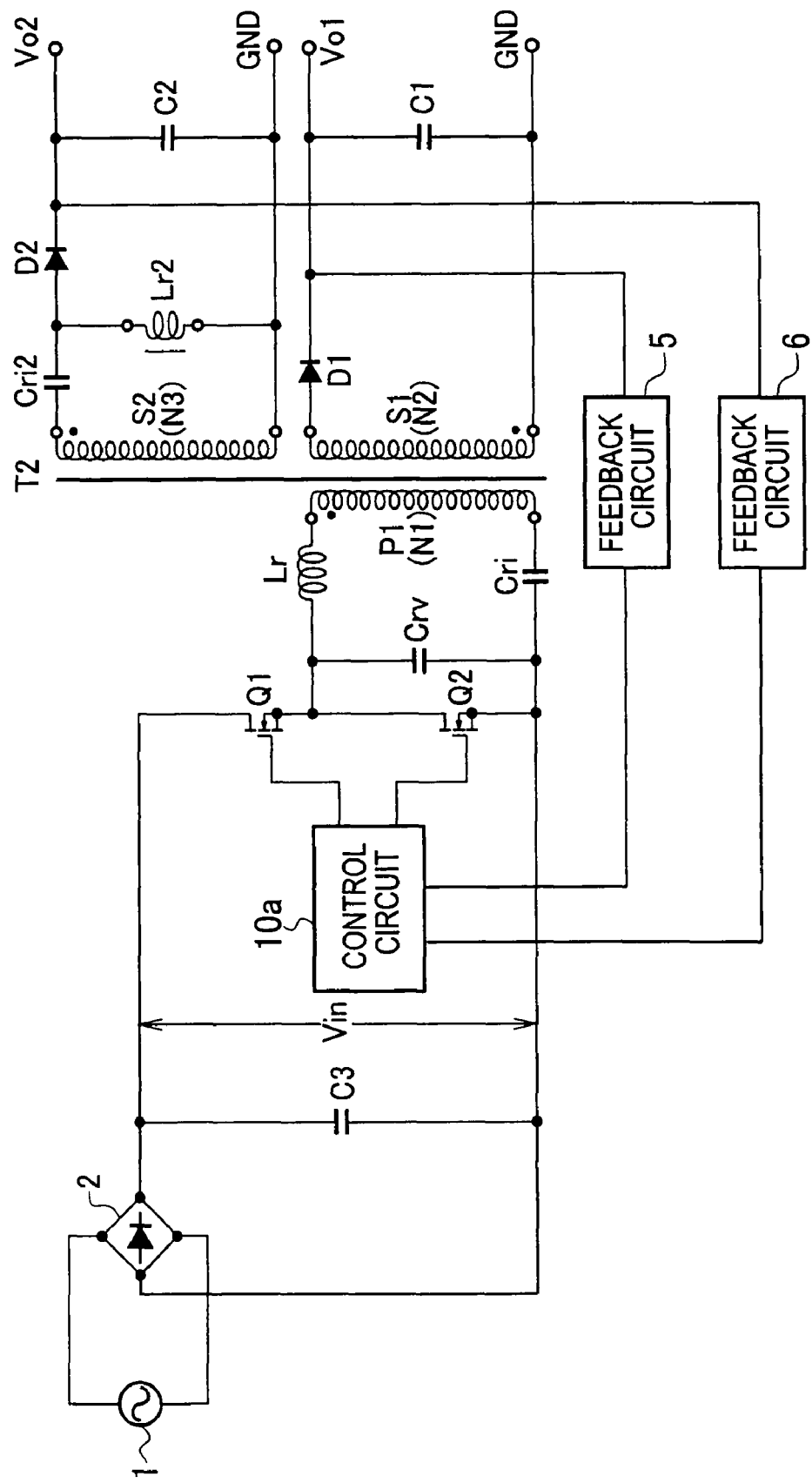
FIG. 12 is a circuit diagram illustrating the configuration of a multiple output switching power source apparatus according to an embodiment 4 of the present invention.
Figure 13:
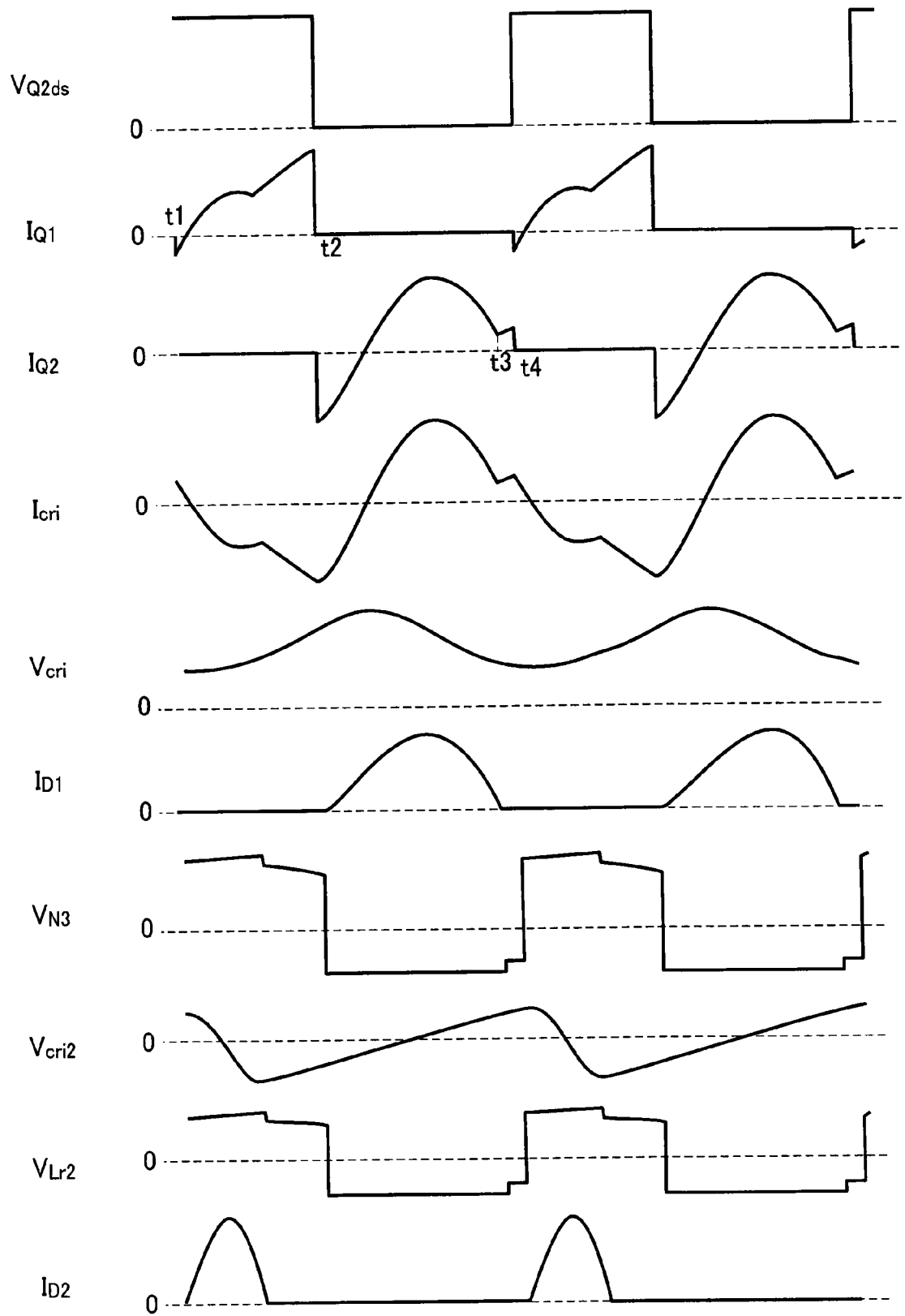
FIG. 13 is a waveform diagram illustrating operation of the multiple output switching power source apparatus according to the embodiment 4 of the present invention.

FIG. 12 is a circuit diagram illustrating the configuration of a multiple output switching power source apparatus according to the embodiment 4 of the present invention and FIG. 13 is a waveform diagram illustrating the operation thereof.

The meanings of marks in FIG. 13 are the same as those of FIG. 5. FIG. 13 illustrates waveforms with a first secondary winding S1 and second secondary winding S2 of a transformer T2 being loosely coupled with each other, or a first reactor being inserted.

This multiple output switching power source apparatus reverses the polarities of the second secondary winding S2 of the multiple output switching power source apparatus according to the embodiment 3. In the following, parts that differ from those of the embodiment 1 will mainly be explained.

Control of a first output voltage Vo1 is carried out, like the multiple output switching power source apparatus of the related art, by controlling the duties of a first switching element Q1 and a second switching element Q2. Namely, by changing the duty ratios of the first switching element Q1 and second switching element Q2, a voltage stored in a first current resonant capacitor Cri during an ON period of the first switching element Q is adjusted. In an ON period of the second switching element Q2, energy accumulated in the first current resonant capacitor Cri makes a first resonant reactor Lr and the first current resonant capacitor Cri resonate. As a result, a resonant current passes to transmit energy to the secondary side of a transformer T2, thereby controlling the energy to be transmitted to the secondary side. A voltage generated by a first secondary winding S1 is rectified and smoothed by a first rectifying-smoothing circuit having a diode D1 and smoothing capacitor C1, to output the first output voltage Vo1 from a first output terminal.

Control of a second output voltage Vo2 will be explained. A second series resonant circuit having a second current resonant capacitor Cri2 and second resonant reactor Lr2 conducts, in an ON period of the second switching element Q2, a resonant operation with a voltage of (Vo1+Vf) generated by the first secondary winding S1, to accumulate energy in the second current resonant capacitor Cri2. In an ON period of the first switching element Q1, a voltage obtained by adding a voltage corresponding to the energy accumulated in the second current resonant capacitor Cri2 to a voltage generated by the first secondary winding S1 is rectified and smoothed through a second rectifying-smoothing circuit having a diode D2 and smoothing capacitor C2, to output the second output voltage Vo2 from a second output terminal. At this time, the second current resonant capacitor Cri2 decreases the voltage corresponding to the energy accumulated therein due to discharge, and thereafter, is charged by a current in a reverse direction due to the voltage of the secondary winding S1. When the charging of the smoothing capacitor C2 ends, the diode D2 passes no current and the second current resonant capacitor Cri2 gradually discharges due to a resonant operation with the second resonant reactor Lr2 and is then charged reversely. During this operation, the second switching element Q2 turns off and the first switching element Q1 turns on, so that the secondary winding S1 reversely induces a voltage and the discharging and reverse charging operations continue.

In this way, the second current resonant capacitor Cri2 discharges only during a period in which the second switching element Q2 turns on to charge the smoothing capacitor C2 and is charged during the remaining ON period of the second switching element Q2 and an ON period of the first switching element Q1. Namely, except the period of charging the smoothing capacitor C2, the second current resonant capacitor Cri2 is charged in most of a switching period of the first switching element Q1 and second switching element Q2. By changing the switching period, i.e., switching frequency of the first switching element Q1 and second switching element Q2, it is possible to adjust the charging period of the second current resonant capacitor Cri2 and thereby control the second output voltage Vo2. More precisely, according to a second output voltage error signal provided by a feedback circuit 6, an ON period of the second switching element Q2 is controlled, and according to a first output voltage error signal provided by a feedback circuit 5, an ON period of the first switching element Q1 is controlled, to adjust duties of the first switching element Q1 and second switching element Q2. The first output voltage error signal determines the duties and adjusts the first output voltage, and therefore, controlling an ON period of the second switching element according to the second output voltage error signal results in changing the switching frequency and adjusting the second output voltage.

The above-mentioned multiple output switching power source apparatus according to the embodiment 4 controls an ON period of the second switching element Q2 with the second voltage error signal based on the second output voltage Vo2 and controls an ON period of the first switching element Q1 with the first voltage error signal based on the first output voltage Vo1. It is noted that the same result will be obtained by controlling an ON period of the second switching element Q2 with the first voltage error signal based on the first output voltage Vo1 and controlling an ON period of the first switching element Q1 with the second voltage error signal based on the second output voltage Vo2.

Like the embodiment 2, this embodiment can output constant power to the second output terminal even if an input voltage decreases.

This embodiment loosely couples the first secondary winding and second secondary winding of the transformer with each other, to increase a leakage inductance, suppress current peaks, and reduce losses in the rectifying-smoothing circuits.

Embodiment 5

Figure 14:
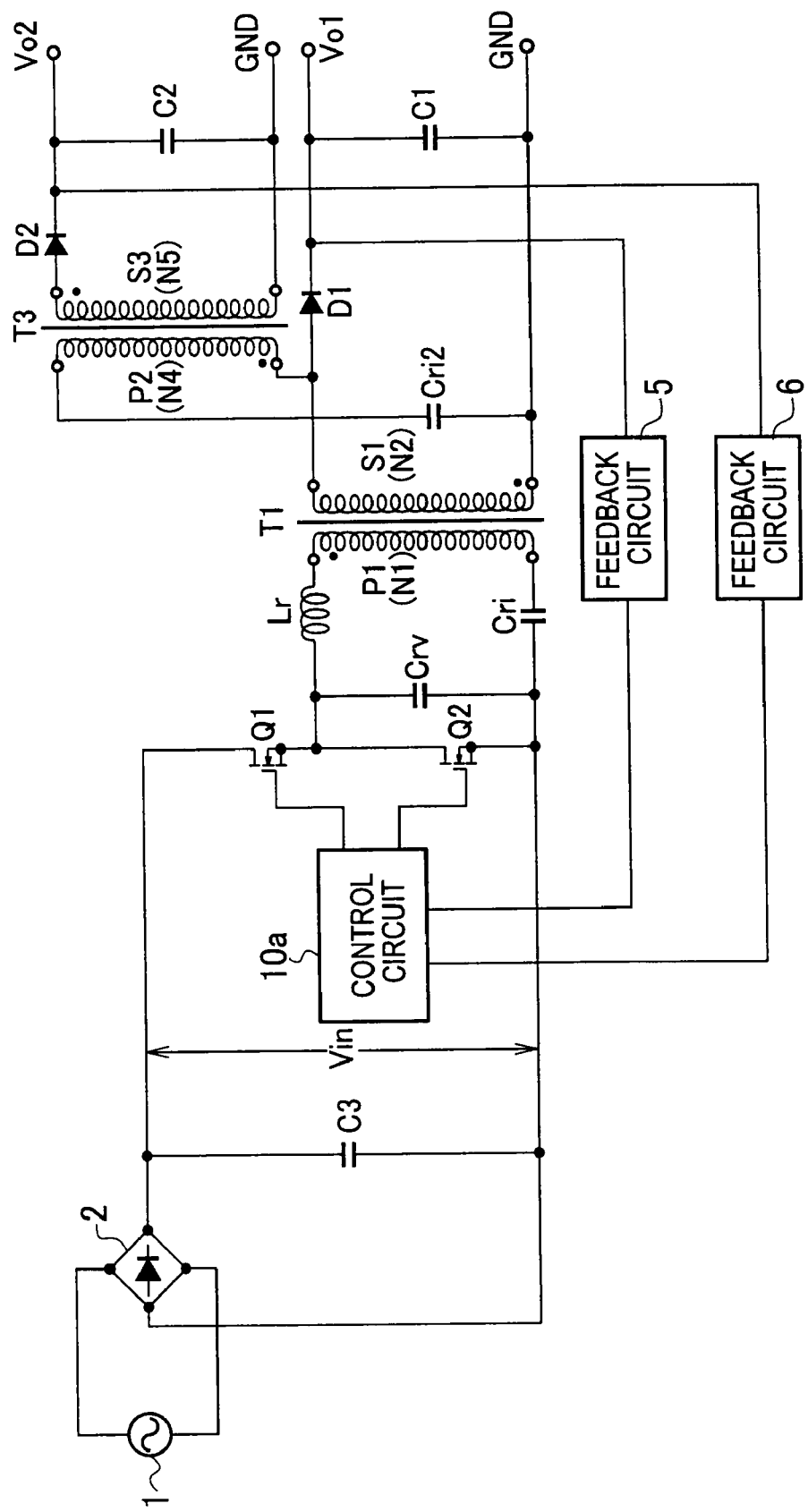
FIG. 14 is a circuit diagram illustrating the configuration of a multiple output switching power source apparatus according to an embodiment 5 of the present invention.
Figure 15:
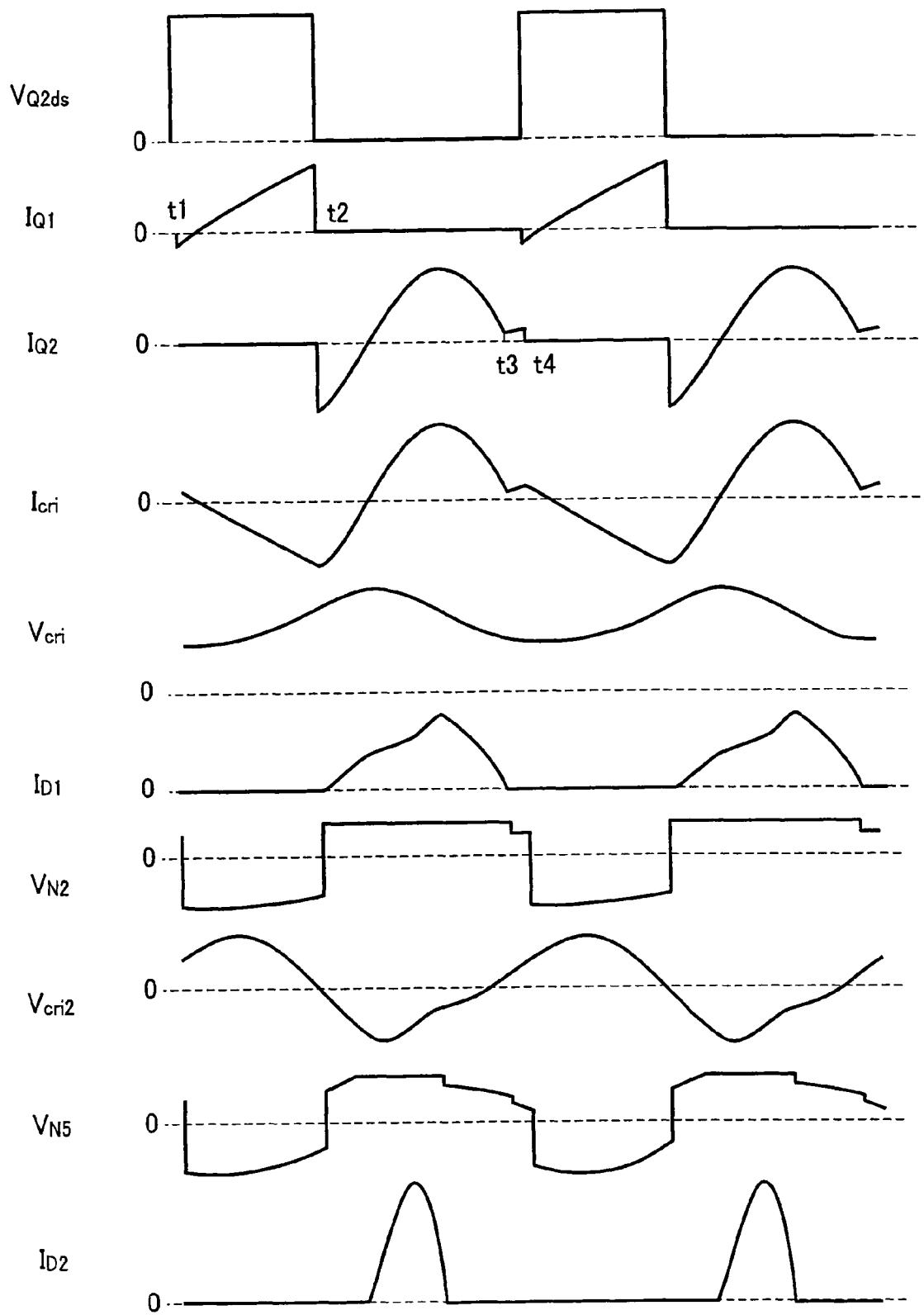
FIG. 15 is a waveform diagram illustrting operation of the multiple output switching power source apparatus according to the embodiment 5 of the present invention.

FIG. 14 is a circuit diagram illustrating the configuration of a multiple output switching power source apparatus according to the embodiment 5 of the present invention and FIG. 15 is a waveform diagram illustrating the operation thereof. The meanings of marks in FIG. 15 are the same as those of FIG. 5.

The multiple output switching power source apparatus according to the embodiment 5 is configured such that the second resonant reactor Lr2 of the multiple output switching power source apparatus according to the embodiment 1 illustrated in FIG. 4 is included in a primary winding P2 (the number of turns of N4) of a second transformer T3 and a voltage generated by a secondary winding S3 (the number of turns of N5) of the second transformer T3 is rectified and smoothed through a second rectifying-smoothing circuit having a diode D2 and smoothing capacitor C2, to output a second output voltage Vo2 from a second output terminal. In the following, parts that differ from those of the embodiment 1 will mainly be explained.

Control of a first output voltage Vo1 is carried out, like the multiple output switching power source apparatus of the related art, by controlling the ON-period duties of a first switching element Q1 and a second switching element Q2. Namely, by changing the duty ratios of the first switching element Q1 and second switching element Q2, a voltage stored in a first current resonant capacitor Cri during an ON period of the first switching element Q1 is adjusted. In an ON period of the second switching element Q2, energy accumulated in the first current resonant capacitor Cri makes a first resonant reactor Lr and the first current resonant capacitor Cri resonate, so that a resonant current passes to transmit energy to the secondary side. Namely, by controlling the ON periods of Q1 and Q2, it is possible to control the energy to be transmitted to the secondary side. A voltage generated by a first secondary winding S1 is rectified and smoothed by a first rectifying-smoothing circuit having a diode D1 and smoothing capacitor C1, to output the first output voltage Vo1 from a first output terminal.

Control of the second output voltage Vo2 will be explained. Like the multiple output switching power source apparatus according to the embodiment 1, in an ON period of the first switching element Q1, a differential voltage between an input voltage Vin and a terminal voltage of the first current resonant capacitor Cri is applied to the primary winding P1, and therefore, the second secondary winding S3 generates a voltage that is the differential voltage multiplied by a turn ratio. The voltage generated by the second secondary winding S3 is applied to a second series resonant circuit having a second current resonant capacitor Cri2 and the second resonant reactor Lr2, so that the second series resonant circuit resonates to gradually charge the second current resonant capacitor Cri2.

In an ON period of the second switching element Q2, the secondary winding S3 of the second transformer T3 generates a voltage that is obtained by multiplying the sum of a voltage generated by the first secondary winding S1 and a voltage corresponding to energy accumulated in the second current resonant capacitor Cri2 by a turn ratio. The generated voltage is rectified and smoothed through the second rectifying-smoothing circuit having the diode D2 and smoothing capacitor C2, to output the second output voltage Vo2 from the second output terminal. At this time, the second current resonant capacitor Cri2 discharges to decrease the voltage corresponding to the accumulated energy, and thereafter, is charged by a current flowing in a reverse direction due to the voltage of the secondary winding S1. When the charging of the smoothing capacitor C2 ends, the diode D2 passes no current and the second current resonant capacitor Cri2 gradually discharges due to a resonant operation with the second resonant reactor Lr2 and is then charged in a reverse manner. During this operation, the second switching element Q2 turns off and the first switching element Q1 turns on, so that the secondary winding S1 reversely induces a voltage and the discharging and reverse charging operations continue.

In this way, the second current resonant capacitor Cri2 discharges only during a period in which the second switching element Q2 turns on to charge the smoothing capacitor C2 and is charged during the remaining ON period of the second switching element Q2 and an ON period of the first switching element Q1. Namely, except the period of charging the smoothing capacitor C2, the second current resonant capacitor Cri2 is charged in most of a switching period of the first switching element Q1 and second switching element Q2. By changing the switching period, i.e., switching frequency of the first switching element Q1 and second switching element Q2, it is possible to adjust the charging period of the second current resonant capacitor Cri2 and thereby control the second output voltage Vo2. More precisely, according to a second output voltage error signal provided by a feedback circuit 6, an ON period of the second switching element Q2 is controlled, and according to a first output voltage error signal provided by a feedback circuit 5, an ON period of the first switching element Q1 is controlled, to adjust the duties of the first switching element Q1 and second switching element Q2. Namely, the first output voltage error signal determines the duties and adjusts the first output voltage, and therefore, controlling an ON period of the second switching element according to the second output voltage error signal results in changing the switching frequency and adjusting the second output voltage.

The above-mentioned multiple output switching power source apparatus according to the embodiment 5 controls an ON period of the second switching element Q2 with the second voltage error signal based on the second output voltage Vo2 and controls an ON period of the first switching element Q1 with the first voltage error signal based on the first output voltage Vo1. The same result will be obtained by controlling an ON period of the second switching element Q2 with the first voltage error signal based on the first output voltage Vo1 and controlling an ON period of the first switching element Q1 with the second voltage error signal based on the second output voltage Vo2.

Figure 10:
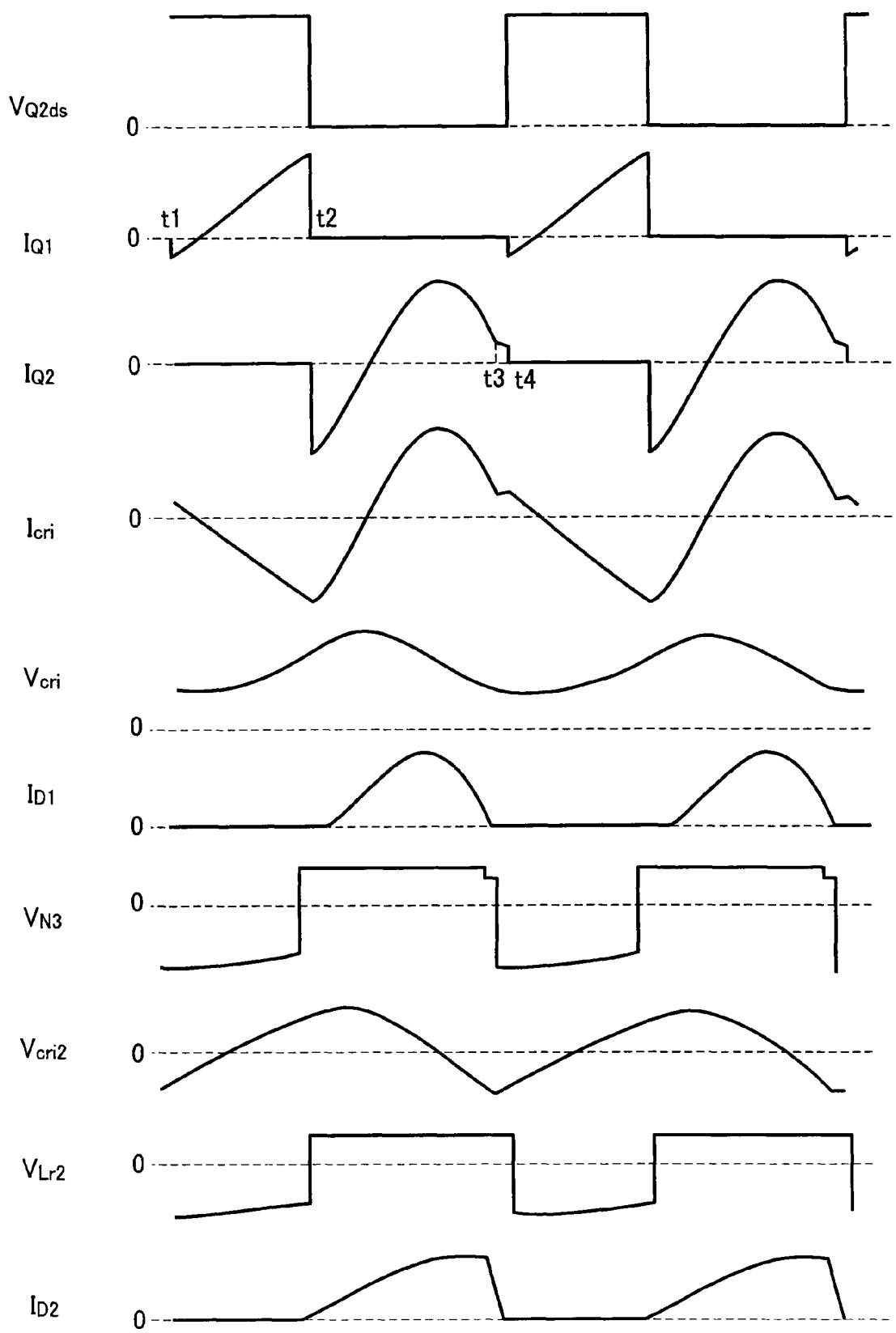
FIG. 10 is a waveform diagram illustrating operation of a modification of the multiple output switching power source apparatus according to the embodiment 3 of the present invention.
Figure 11:
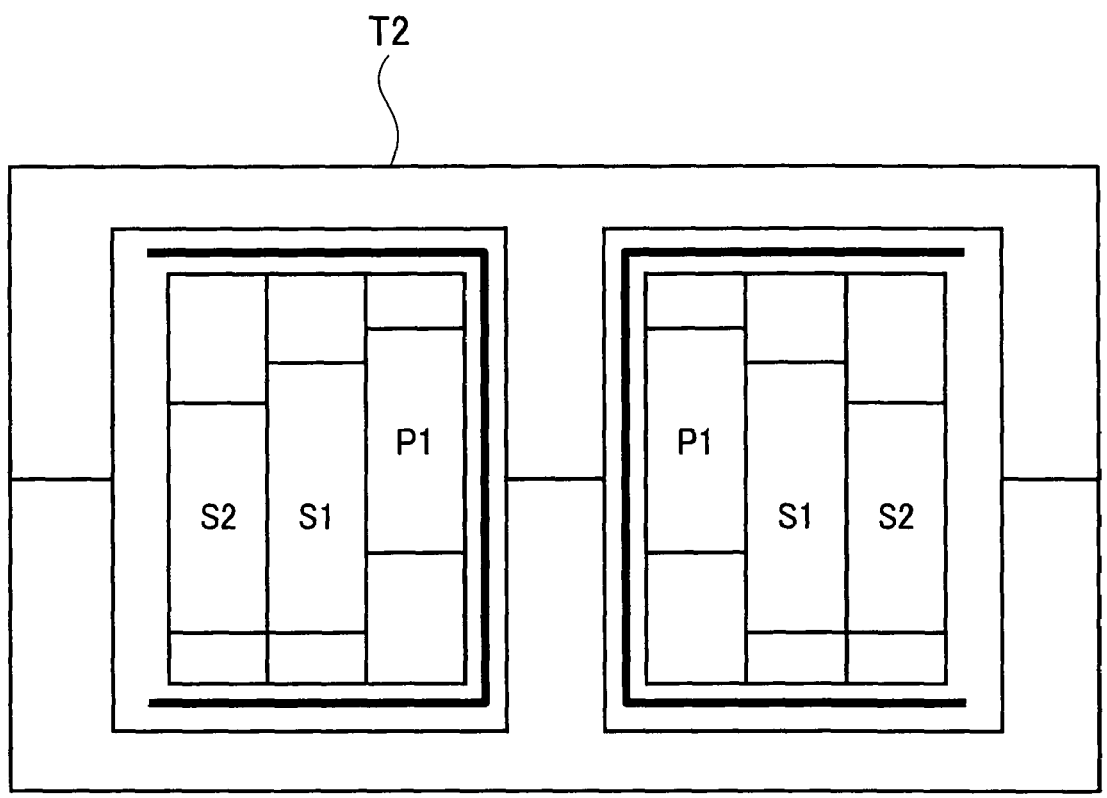
FIG. 11 is a view illustrating the structure of a transformer used in the modification of the multiple output switching power source apparatus according to the embodiment 3 of the present invention.

The primary winding P2 and secondary winding S3 of the second transformer T3 may loosely be coupled with each other to increase a reactor component Like the multiple output switching power source apparatus according to the modification of the embodiment 3 and as illustrated in the waveforms of FIG. 10, it is possible to suppress a current peak when outputting a voltage to the first output terminal or the second output terminal, provide a current that gently changes, and reduce losses in the rectifying-smoothing circuits.

According to this embodiment, the second resonant reactor is provided by the separate winding that forms the second transformer. Since a voltage is adjustable according to a turn ratio of the second transformer, an output voltage can freely be set without regard to a turn ratio of the first transformer.

Embodiment 6

Figure 16:
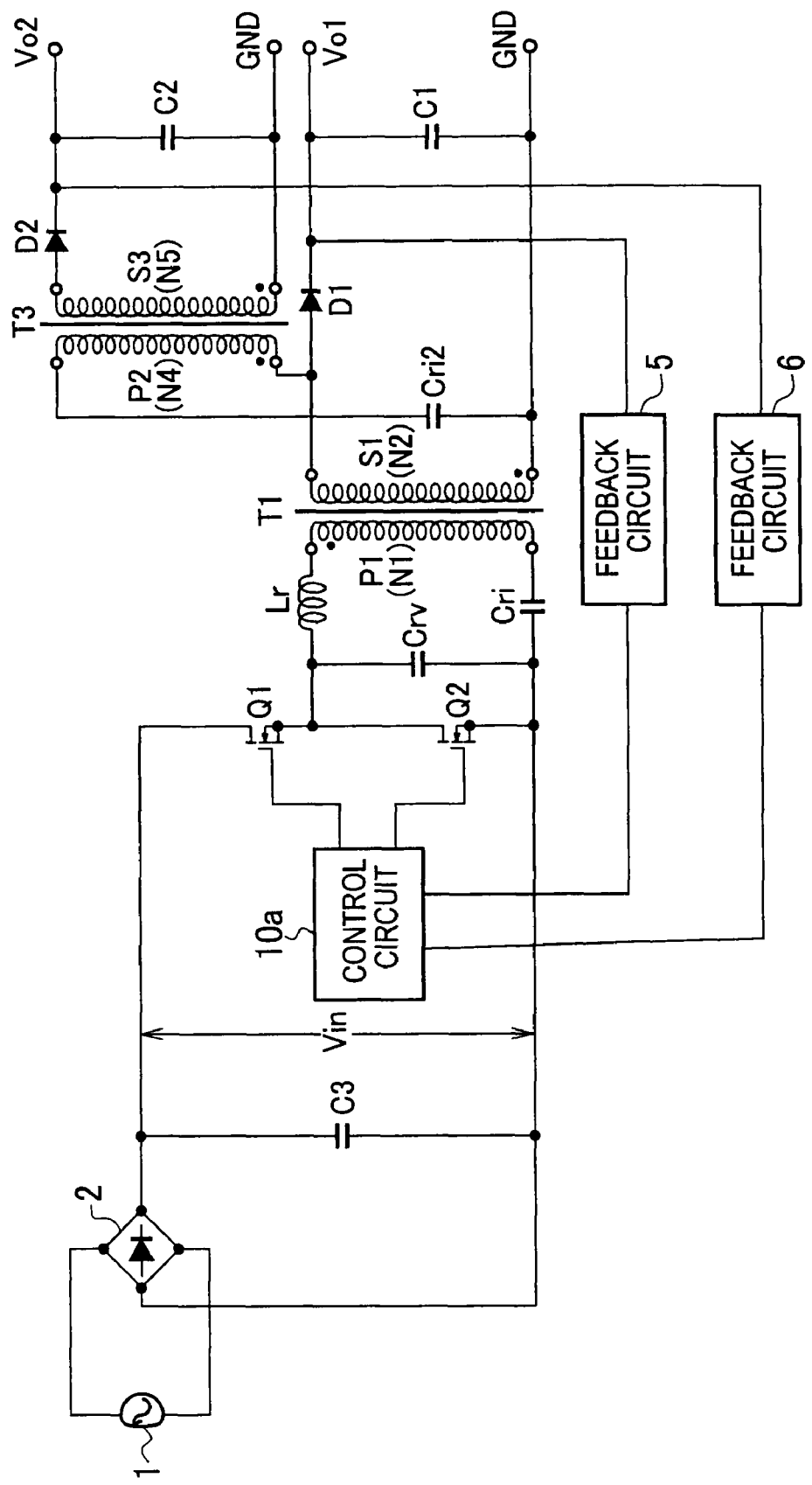
FIG. 16 is a circuit diagram illustrating the configuration of a multiple output switching power source apparatus according to an embodiment 6 of the present invention.
Figure 17:
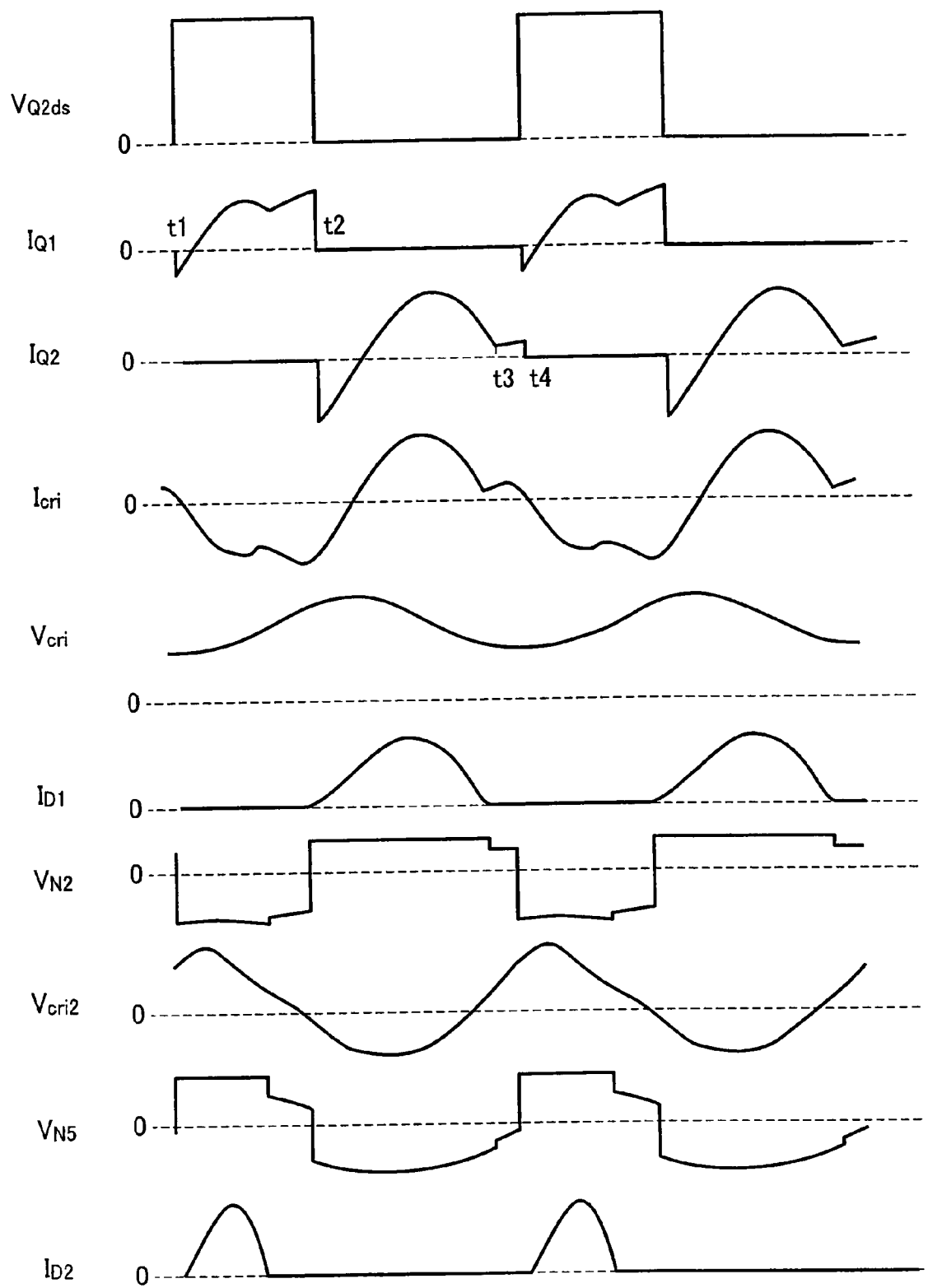
FIG. 17 is a waveform diagram illustrting operation of the multiple output switching power source apparatus according to the embodiment 6 of the present invention.

FIG. 16 is a circuit diagram illustrating the configuration of a multiple output switching power source apparatus according to the embodiment 6 of the present invention and FIG. 17 is a waveform diagram illustrating the operation of the multiple output switching power source apparatus. The meanings of marks in FIG. 17 are the same as those of FIG. 5.

This multiple output switching power source apparatus reverses the polarities of the secondary winding S3 of the second transformer T3 in the multiple output switching power source apparatus according to the embodiment 5. In the following, parts that differ from those of the embodiment 1 will mainly be explained.

Control of a first output voltage Vo1 is carried out, like the multiple output switching power source apparatus of the related art, by controlling the duties of a first switching element Q1 and a second switching element Q2. Namely, by changing the duty ratios of the first switching element Q1 and second switching element Q2, a voltage stored in a first current resonant capacitor Cri during an ON period of the first switching element Q1 is adjusted. In an ON period of the second switching element Q2, energy accumulated in the first current resonant capacitor Cri makes a first resonant reactor Lr and the first current resonant capacitor Cri produce a resonant current that causes energy to be transmitted to the secondary side, thereby controlling the energy to be transmitted to the secondary side. A voltage generated by the first secondary winding S1 is rectified and smoothed by a first rectifying-smoothing circuit having a diode D1 and smoothing capacitor C1, to output the first output voltage Vo1 from a first output terminal.

Control of a second output voltage Vo2 will be explained. A second series resonant circuit having a second current resonant capacitor Cri2 and a primary winding P2 of the second transformer T3 conducts, in an ON period of the second switching element Q2 contrary to the multiple output switching power source apparatus according to the embodiment 1, a resonant operation by the application of a voltage (Vo1+Vf) generated by the first secondary winding S1, to accumulate energy in the second current resonant capacitor Cri2.

In an ON period of the first switching element Q1, the secondary winding S3 of the second transformer T3 generates a voltage that is obtained by multiplying the sum of a voltage generated by the first secondary winding S1 and a voltage corresponding to the energy accumulated in the second current resonant capacitor Cri2 by a turn ratio. The voltage is rectified and smoothed through a second rectifying-smoothing circuit having a diode D2 and smoothing capacitor C2, to output the second output voltage Vo2 from a second output terminal. At this time, the second current resonant capacitor Cri2 discharges to decrease the voltage corresponding to the accumulated energy, and thereafter, is charged by a current flowing in a reverse direction due to the voltage of the secondary winding S3. When the charging of the smoothing capacitor C2 ends, the diode D2 passes no current and the second current resonant capacitor Cri2 gradually discharges due to a resonant operation with a second resonant reactor Lr2 and is then charged in a reverse manner. During this operation, the second switching element Q2 turns off and the first switching element Q1 turns on, so that the secondary winding S3 reversely induces a voltage and the discharging and reverse charging operations continue.

In this case, a charging period of the second current resonant capacitor Cri2 is determined by an ON period of the first switching element Q1 and an ON period of the second switching element Q2. At this time, the ON period of the first switching element Q1 is controlled to the duty that may keep the first output voltage Vo1 constant. Accordingly, controlling the ON period of the second switching element Q2, i.e., changing the switching frequency of the second switching element Q2 results in changing energy accumulated in the second current resonant capacitor Cri2 and controlling the second output voltage Vo2. Namely, a control circuit 10a changes the ON period, i.e., switching frequency of the second switching element Q2 in response to a second voltage error signal sent from a feedback circuit 6, to control the second output voltage Vo2 output from the second output terminal.

The above-mentioned multiple output switching power source apparatus according to the embodiment 6 is configured to control an ON period of the second switching element Q2 with the second voltage error signal based on the second output voltage Vo2 and control an ON period of the first switching element Q1 with the first voltage error signal based on the first output voltage Vo1. The same result will be obtained by controlling an ON period of the second switching element Q2 with the first voltage error signal based on the first output voltage Vo1 and controlling an ON period of the first switching element Q1 with the second voltage error signal based on the second output voltage Vo2.

Like the embodiment 2, it is possible to output constant power to the second output terminal even if an input voltage decreases.

According to the embodiments 1, 3, and 5, in an ON period of the switching element Q2, a voltage generated by the secondary winding is rectified and smoothed to provide the first output voltage and a voltage of the second resonant reactor is rectified and smoothed to provide the second output voltage. Instead, in an ON period of the switching element Q1, a voltage generated by the secondary winding may be rectified and smoothed to provide the first output voltage and a voltage of the second resonant reactor may be rectified and smoothed to provide the second output voltage, to realize the same effect According to the embodiments 2, 4, and 6, in an ON period of the switching element Q2, a voltage generated by the secondary winding is rectified and smoothed to provide the first output voltage, and in an ON period of the switching element Q1, a voltage of the second resonant reactor is rectified and smoothed to provide the second output voltage. Instead, in an ON period of the switching element Q1, a voltage generated by the secondary winding may be rectified and smoothed to provide the first output voltage, and in an ON period of the switching element Q2, a voltage of the second resonant reactor may be rectified and smoothed to provide the second output voltage, to realize the same effect.

Embodiment 7

Figure 18:
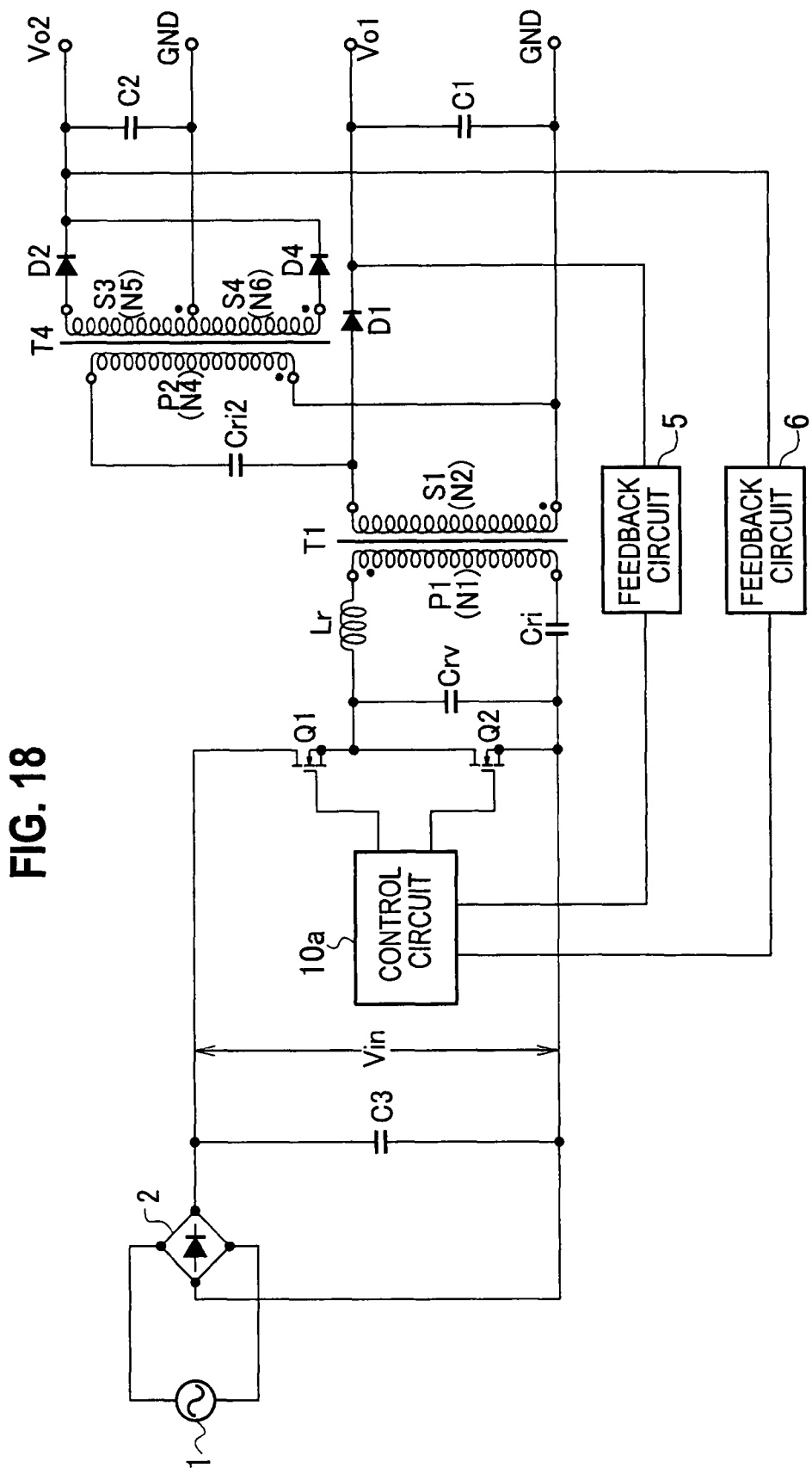
FIG. 18 is a circuit diagram illustrating the configuration of a multiple output switching power source apparatus according to an embodiment 7 of the present invention.

FIG. 18 is a circuit diagram illustrating the configuration of a multiple output switching power source apparatus according to the embodiment 7 of the present invention. In connection with this multiple output switching power source apparatus, parts that differ from those of the multiple output switching power source apparatus according to the embodiment 6 will mainly be explained.

On the secondary side of a transformer T1, a secondary winding S1 (the number of turns of N2) is wound to generate a voltage whose phase is opposite to that of a voltage of a primary winding P1 of the transformer T1. The secondary winding S1 (the number of turns of N2) is connected in parallel with a first rectifying-smoothing circuit and second series resonant circuit. A second transformer T4 has a primary winding P2 (the number of turns of N4) forming the second series resonant circuit, a first secondary winding S3 (the number of turns of N5), and a second secondary winding S4 (the number of turns of N6) connected in series with the first secondary winding S3.

The first rectifying-smoothing circuit has a diode D1 and a smoothing capacitor C1. An anode of the diode D1 is connected to a first end of the secondary winding S1 and a cathode thereof is connected to a first output terminal. The smoothing capacitor C1 is connected between the cathode of the diode D1 (the first output terminal) and a second end of the secondary winding S1 (a ground terminal). The first rectifying-smoothing circuit rectifies and smoothes a voltage induced by the secondary winding S1 of the transformer T1 and outputs a first output voltage Vo1 from the first output terminal.

The second series resonant circuit has a second current resonant capacitor Cri2 whose first end is connected to the first end of the secondary winding S1 of the transformer T1 (the anode of the diode D1) and the primary winding P2 of the second transformer T4 connected between a second end of the second current resonant capacitor Cri2 and the second end of the secondary winding S1 (the ground terminal). Namely, this is equivalent to the second series resonant circuit of the embodiment 1 with the second resonant reactor Lr2 being included in the primary winding P2 of the second transformer T4.

A second rectifying-smoothing circuit has diodes D2 and D4 and a smoothing capacitor C2. An anode of the diode D2 is connected to the first secondary winding S3 of the second transformer T4 and a cathode thereof is connected to a second output terminal. An anode of the diode D4 is connected to the second secondary winding S4 of the second transformer T4 and a cathode thereof is connected to the second output terminal. A connection point of the first secondary winding S3 and second secondary winding S4 of the second transformer T4 is connected to the ground terminal.

The smoothing capacitor C2 is connected between the cathodes of the diodes D2 and D4 (the second output terminal) and the second end of the secondary winding S1 (the ground terminal). The second rectifying-smoothing circuit rectifies and smoothes a voltage that is the sum of a voltage generated by the secondary winding S1 of the transformer T1 and a terminal voltage of the second current resonant capacitor Cri2 and outputs a second output voltage Vo2 from the second output terminal.

Further, this multiple output switching power source apparatus has a feedback circuit 5 and a feedback circuit 6, to feed voltages generated on the secondary side of the transformer T1 back to the primary side. The feedback circuit 5 compares the first output voltage Vo1 output to the first output terminal with a predetermined reference voltage and feeds an error voltage as a first voltage error signal back to a control circuit 10a on the primary side. The feedback circuit 6 compares the second output voltage Vo2 output to the second output terminal with a predetermined reference voltage and feeds an error voltage as a second voltage error signal back to the control circuit 10a on the primary side.

Based on the first voltage error signal from the feedback circuit 5 and the second voltage error signal from the feedback circuit 6, the control circuit 10a alternately turns on/off a first switching element Q1 and a second switching element Q2, to carry out PWM control so that the first output voltage Vo1 and second output voltage Vo2 remain constant. In this case, gates of the first switching element Q1 and second switching element Q2 receive voltages as control signals that create a dead time of about several hundreds of nanoseconds.

As a result, the first switching element Q1 and second switching element Q2 alternately turn on/off without overlapping their ON periods with each other.

Figure 19:
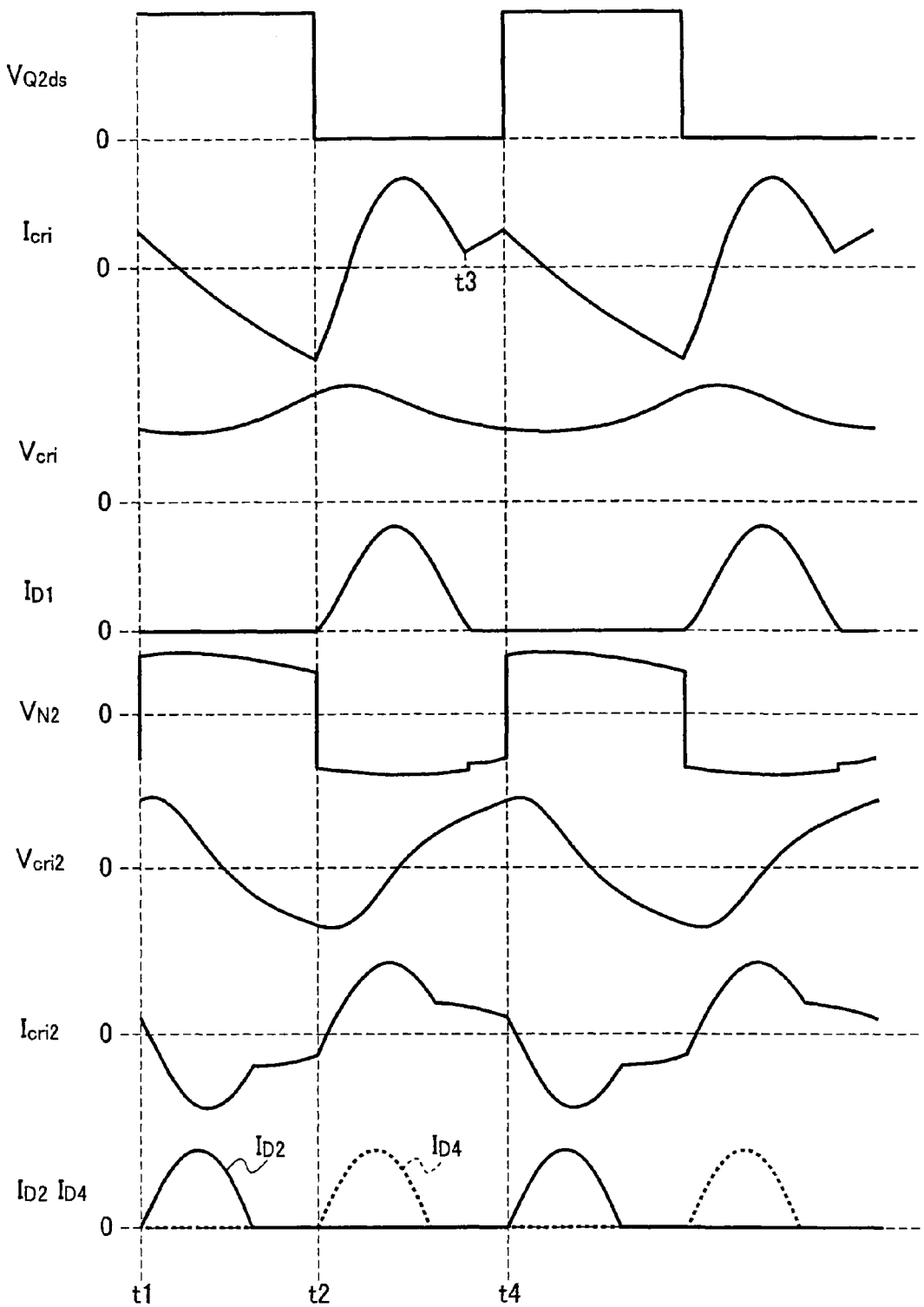
FIG. 19 is a waveform diagram illustrating operation under heavy load of the multiple output switching power source apparatus according to the embodiment 7 of the present invention.

Operation of the multiple output switching power source apparatus according to the embodiment 7 of the present invention having the above-mentioned configuration will be explained with reference to waveforms illustrated in FIG. 19. FIG. 19 is a waveform diagram illustrating operation under heavy load. The meanings of marks in FIG. 19 are the same as those of FIG. 5.

Control of the first output voltage Vo1 is carried out, like the multiple output switching power source apparatus of the related art, by controlling duties of the first switching element Q1 and second switching element Q2. Namely, by changing the duty ratios of the first switching element Q1 and second switching element Q2, a voltage stored in a first current resonant capacitor Cri during an ON period of the first switching element Q1 is adjusted.

In an ON period of the second switching element Q2, energy accumulated in the first current resonant capacitor Cri makes a first resonant reactor Lr and the first current resonant capacitor Cri resonate. As a result, a resonant current passes to transmit energy to the secondary side of the transformer T1, and therefore, it is possible to control the energy to be transmitted to the secondary side. A voltage generated by the secondary winding S1 is rectified and smoothed by the first rectifying-smoothing circuit having the diode D1 and smoothing capacitor C1, to output the first output voltage Vo1 from the first output terminal.

Control of the second output voltage Vo2 will be explained. In an ON period (for example, time t1 to t2) of the first switching element Q1, a differential voltage between an input voltage Vin and a terminal voltage of the first current resonant capacitor Cri is applied to the primary winding P1, and therefore, the secondary winding S1 generates a voltage that is the differential voltage multiplied by a turn ratio. The sum of this voltage and the voltage of the second current resonant capacitor Cri2 is applied to the primary winding P2 of the second transformer T4. Then, the second secondary winding S4 of the second transformer T4 generates the voltage multiplies by a turn ratio, to pass a current through a path along S4, D4, C2, and S4. The voltage is rectified and smoothed by the diode D4 and smoothing capacitor C2, to output the second output voltage Vo2.

At the same time, the voltage generated by the secondary winding S1 is applied to the second series resonant circuit having the second current resonant capacitor Cri2 and second resonant reactor Lr2, so that the second series resonant circuit resonates to gradually discharge the second current resonant capacitor Cri2 and charge the same in a reverse manner.

In an ON period (for example, time t2 to t4) of the second switching element Q2, a voltage generated by the secondary winding S1 becomes higher than the output voltage Vo1 by a forward voltage drop of the diode D1. The sum of this voltage and a voltage of the second current resonant capacitor Cri2 is applied to the primary winding P2 of the second transformer T4. As a result, the first secondary winding S3 of the second transformer T4 generates the voltage times a turn ratio, to pass a current through a path along S3, D2, C2, and S3, so that the voltage is rectified and smoothed by the diode D2 and smoothing capacitor C2, to output the second output voltage Vo2.

At the same time, the voltage generated by the secondary winding S1 is applied to the second series resonant circuit having the second current resonant capacitor Cri2 and second resonant reactor Lr2, to make the second series resonant circuit resonate. As a result, the second current resonant capacitor Cri2 gradually discharges and is charged reversely.

In this way, the second resonant capacitor Cri2 discharges energy for the second output voltage Vo2 in ON periods of the first switching element Q1 and second switching element Q2, and also, is charged and discharged due to a series resonant operation caused by a voltage generated by the first secondary winding S1. In this resonant operation, the amplitude of the second current resonant capacitor Cri2 is adjustable by changing a switching frequency. Namely, lowering the switching frequency enlarges the amplitude of the second current resonant capacitor Cri2 and increasing the switching frequency makes the amplitude of the second current resonant capacitor Cri2 smaller.

In addition, changing the amplitude of the second resonant capacitor Cri2 changes energy to be sent for the second output Vo2. Namely, changing a switching frequency results in adjusting the charging period of the second current resonant capacitor Cri2 and controlling the second output voltage Vo2. More precisely, the second output voltage error signal provided by the feedback circuit 6 is used to control an ON period of the second switching element Q2 and the first output voltage error signal provided by the feedback circuit 5 is used to control an ON period of the first switching element Q1, to thereby adjust duties of the first switching element Q1 and second switching element Q2. Namely, the first output voltage error signal determines the duties to adjust the first output voltage Vo1, and therefore, controlling an ON period of the second switching element Q2 according to the second output voltage error signal results in changing the switching frequency and adjusting the second output voltage Vo2.

The above-mentioned multiple output switching power source apparatus according to the embodiment 7 controls an ON period of the second switching element Q2 with the second voltage error signal based on the second output voltage Vo2 and controls an ON period of the first switching element Q1 with the first voltage error signal based on the first output voltage Vo1. It is noted that the same result will be obtained by controlling an ON period of the second switching element Q2 with the first voltage error signal based on the first output voltage Vo1 and controlling an ON period of the first switching element Q1 with the second voltage error signal based on the second output voltage Vo2.

This embodiment can provide the same effect as that provided by the invention of the embodiment 1 and can further stabilize the second output voltage because the second rectifying-smoothing circuit rectifies and smoothes voltages generated by a plurality of secondary windings of the second transformer.

According to the invention of this embodiment, a current passes through the first diode to the smoothing capacitor when the first switching element is ON (or OFF) and a current passes through the second diode to the smoothing capacitor when the first switching element is OFF (or ON), to reduce a ripple component and further stabilize the second output voltage.

Embodiment 8

Figure 20:
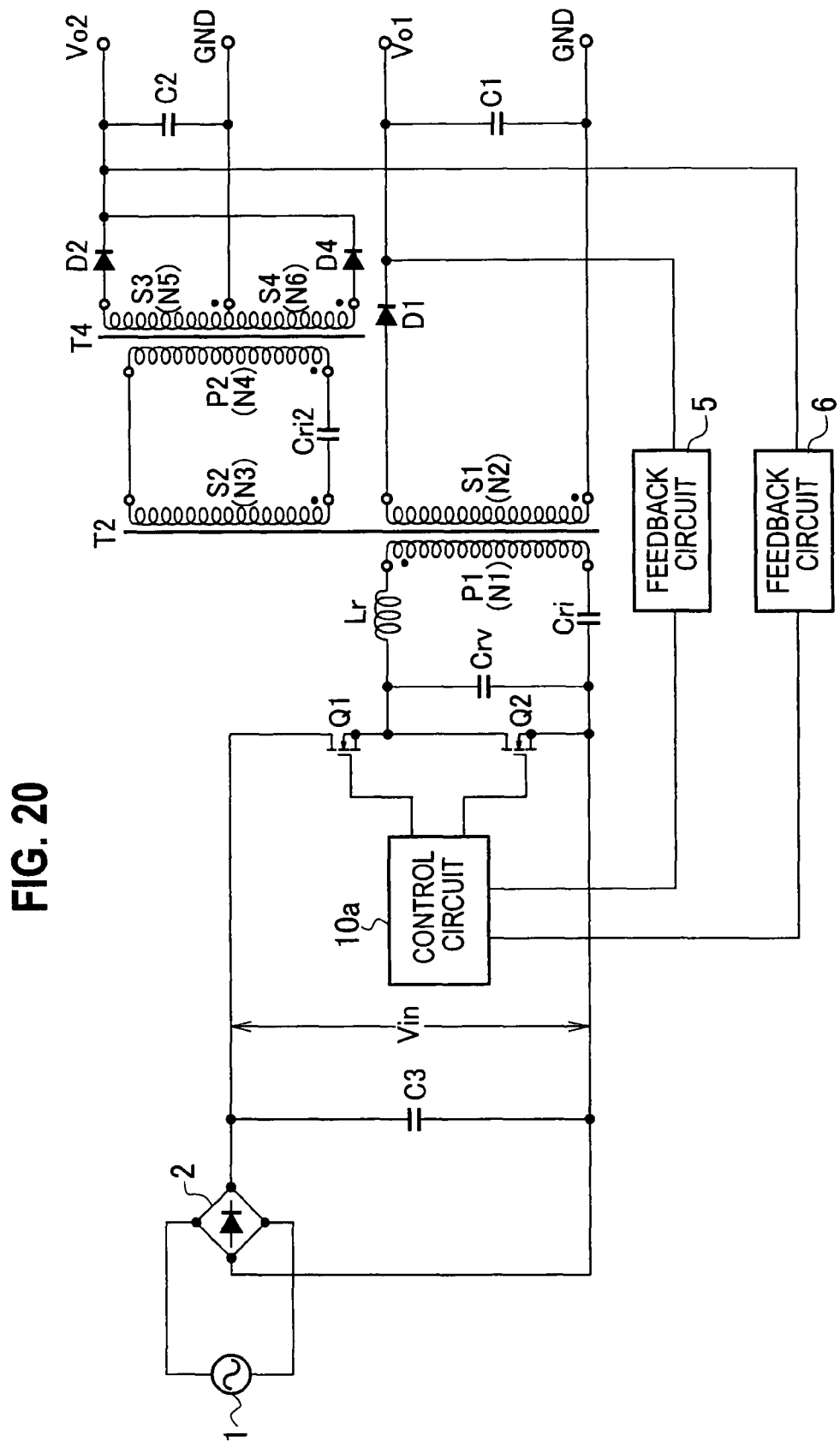
FIG. 20 is a circuit diagram illustrating the configuration of a multiple output switching power source apparatus according to an embodiment 8 of the present invention.

FIG. 20 is a circuit diagram illustrating the configuration of a multiple output switching power source apparatus according to the embodiment 8 of the present invention. This multiple output switching power source apparatus is characterized in that, compared with the multiple output switching power source apparatus of the embodiment 7 illustrated in FIG. 18, a secondary winding of a transformer T2 includes a first secondary winding S1 and a second secondary winding S2 (the number of turns of N3), a first rectifying-smoothing circuit rectifies and smoothes a voltage generated by the first secondary winding S1 of the transformer T2, and a second series resonant circuit is connected in parallel with the second secondary winding S2 of the transformer T2. The remaining configuration thereof is similar to the configuration of the embodiment 7.

According to the embodiment 8 with such a configuration, the second series resonant circuit conducts a resonant operation due to a voltage generated by the second secondary winding S2 of the transformer T2 and operates like the embodiment 7, to realize a similar effect Namely, only by adding the second secondary winding S2 of the transformer T2 to the configuration of the embodiment 7, controlling the ON period of any one of first switching element Q1 and second switching element Q2 results in adjusting output voltages like the above-mentioned invention of the embodiment 7, to stabilize the two outputs.

In addition, when the first switching element Q1 is ON, a current passes through a diode D4 to a capacitor C2, and when the first switching element Q1 is OFF, a current passes through a diode D2 to the capacitor C2, to thereby reduce a ripple component and further stabilize the second output voltage Vo2.

The second secondary winding S2 of the transformer T2 illustrated in FIG. 20 has polarities with a lower side being a winding start (black dot mark). For example, it may have polarities with an upper side being a winding start.

This embodiment only adds the second secondary winding of the first transformer to the invention of the embodiment 7, to control the ON period of any one of the first switching element and second switching element and adjust and stabilize the two output voltages.

Embodiment 9

Figure 21:
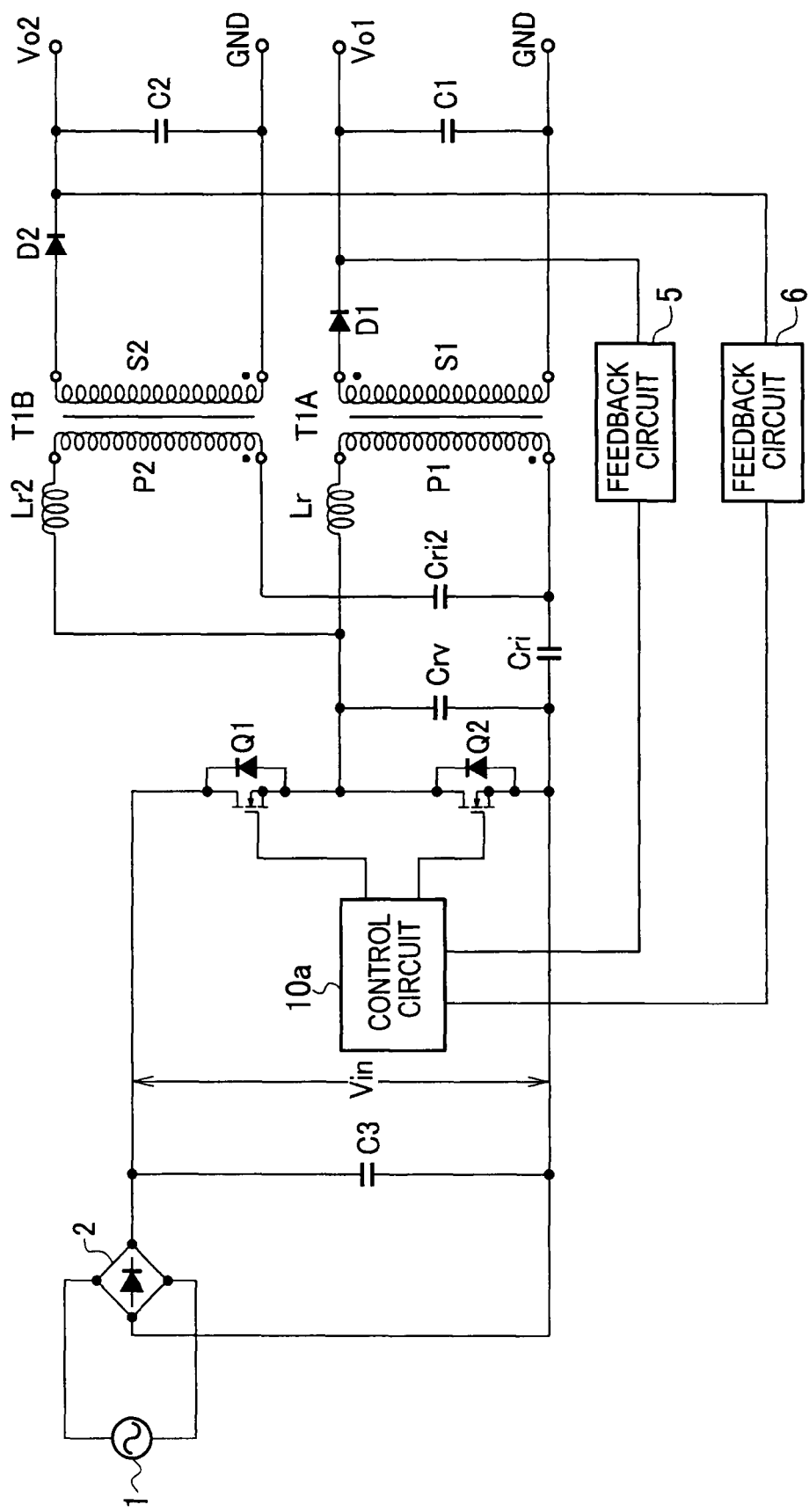
FIG. 21 is a circuit diagram illustrating the configuration of a multiple output switching power source apparatus according to an embodiment 9 of the present invention.

FIG. 21 is a circuit diagram illustrating the configuration of a multiple output switching power source apparatus according to the embodiment 9 of the present invention. According to the embodiments 1 to 8, the second series resonant circuit for generating the second output voltage is arranged on the secondary side of a transformer. Arranging the same on the primary side of the transformer can also constitute a multiple output switching power source apparatus.

More precisely, this multiple output switching power source apparatus has, on the primary side of a first transformer T1A, a full-wave rectifying circuit 2 to rectify an AC voltage from a commercial power source 1, a smoothing capacitor C3 connected between output terminals of the full-wave rectifying circuit 2, to smooth an output from the full-wave rectifying circuit 2, a first switching element Q1 and a second switching element Q2 that are connected in series between both ends of the smoothing capacitor C3, to receive a terminal voltage of the smoothing capacitor C3 as a DC input voltage Vin, a control circuit 10a to control ON/OFF of the first switching element Q1 and second switching element Q2, a voltage resonant capacitor Crv connected in parallel with the second switching element Q2, and a first series resonant circuit connected to both ends of the voltage resonant capacitor Crv.

The first series resonant circuit has a primary winding P1 (the number of turns of N1) of the first transformer T1A, a first resonant reactor Lr, and a first current resonant capacitor Cri that are connected in series. The first resonant reactor Lr is, for example, a leakage inductance between the primary and secondary sides of the first transformer T1A.

On the secondary side of the transformer T1A, a first rectifying-smoothing circuit is connected to a secondary winding S1 (the number of turns of N2) that is wound to generate a voltage whose phase is opposite to the phase of a voltage of the primary winding P1 of the transformer T1A.

The first rectifying-smoothing circuit has a diode D1 and a smoothing capacitor C1. An anode of the diode D1 is connected to a first end of the secondary winding S1 and a cathode thereof is connected to a first output terminal. The smoothing capacitor C1 is connected between the cathode of the diode D1 (the first output terminal) and a second end of the secondary winding S1 (a ground terminal). The first rectifying-smoothing circuit rectifies and smoothes a voltage induced by the secondary winding S1 of the transformer T1A and outputs a first output voltage Vo1 from the first output terminal.

Both ends of the primary winding of the transformer T1A are provided with a second series resonant circuit. The second series resonant circuit has a second resonant reactor Lr2 having a first end connected to a connection point of the switching element Q1 and switching element Q2 and a second end connected to a first end of a primary winding P2 of a second transformer T1B and a second current resonant capacitor Cri2 having a first end connected to a second end of the primary winding P2 and a second end connected to a connection point of a second end of the transformer T1A and the first resonant capacitor Cri. The second resonant reactor Lr2 is, for example, a leakage inductance between the primary and secondary sides of the second transformer T1B. On the secondary side of the second transformer T1B, a second rectifying-smoothing circuit is connected to a secondary winding S2 (the number of turns of N4) that is wound to generate a voltage whose phase is the same as the phase of a voltage of the primary winding P2 of the second transformer T1B.

The second rectifying-smoothing circuit has a diode D2 and a smoothing capacitor C2. An anode of the diode D2 is connected to the secondary winding S2 of the second transformer T1B and a cathode thereof is connected to a second output terminal. The smoothing capacitor C2 is connected between the cathode of the diode D2 (the second output terminal) and the second end of the secondary winding S2 (the ground terminal).

This multiple output switching power source apparatus has a feedback circuit 5 and a feedback circuit 6, to feed the first output voltage Vo1 and second output voltage Vo2 back to the primary side. The feedback circuit 5 compares the first output voltage Vo1 output to the first output terminal with a predetermined reference voltage and feeds an error voltage as a first voltage error signal back to the control circuit 10a on the primary side. The feedback circuit 6 compares the second output voltage Vo2 output to the second output terminal with a predetermined reference voltage and feeds an error voltage as a second voltage error signal back to the control circuit 10a on the primary side.

Based on the first voltage error signal from the feedback circuit 5 and the second voltage error signal from the feedback circuit 6, the control circuit 10a alternately turns on/off the first switching element Q1 and second switching element Q2, to carry out PWM control so that the first output voltage Vo1 and second output voltage Vo2 remain constant. In this case, gates of the first switching element Q1 and second switching element Q2 receive voltages as control signals that create a dead time of about several hundreds of nanoseconds. As a result, the first switching element Q1 and second switching element Q2 alternately turn on/off without overlapping their ON periods with each other.

Operation of the multiple output switching power source apparatus according to the embodiment 9 of the present invention having the above-mentioned configuration will be explained with reference to waveforms illustrated in FIGS. 22 and 23.

Figure 22:
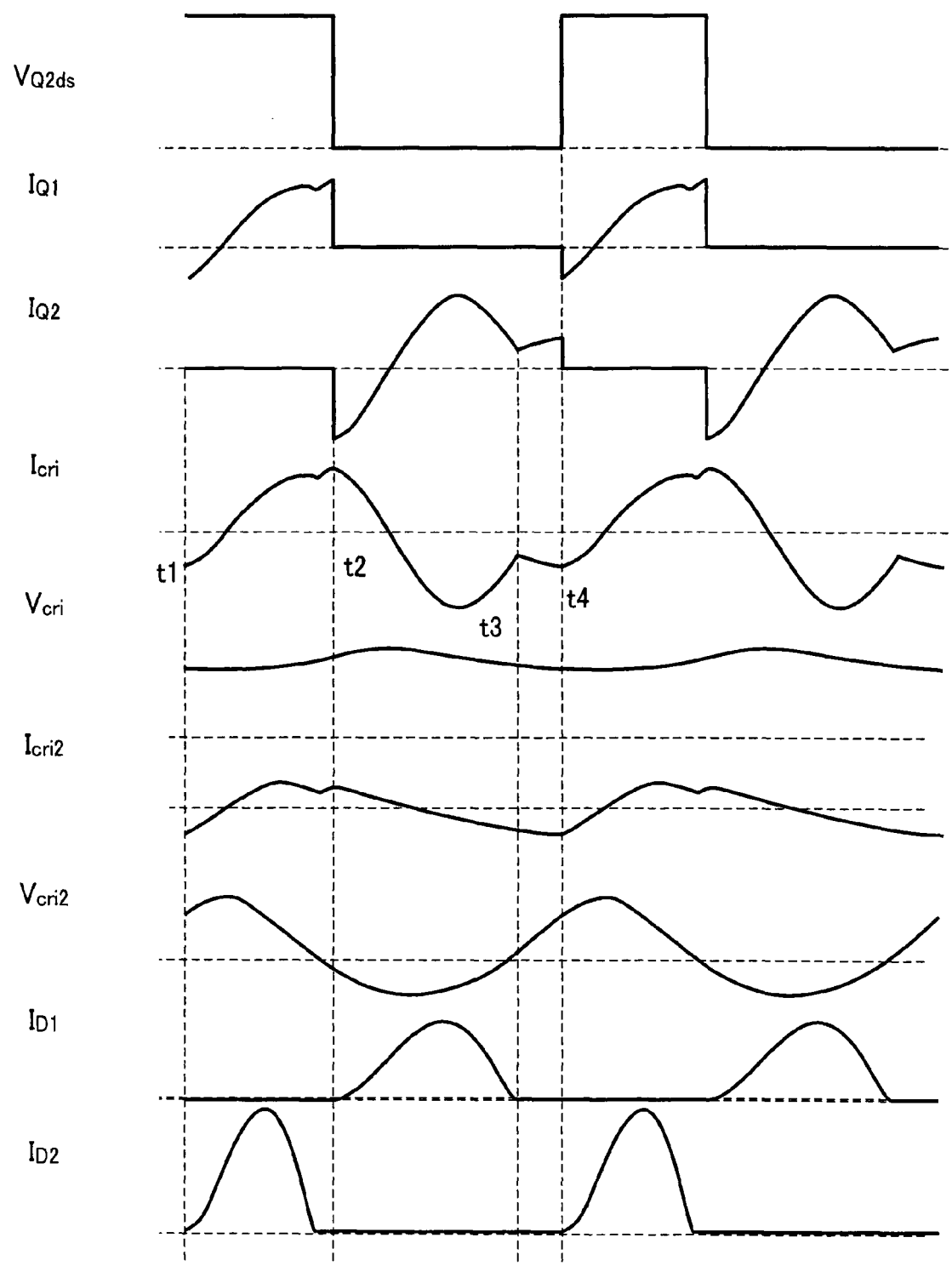
FIG. 22 is a waveform diagram illustrating operation under heavy load of the multiple output switching power source apparatus according to the embodiment 9 of the present invention.
Figure 23:
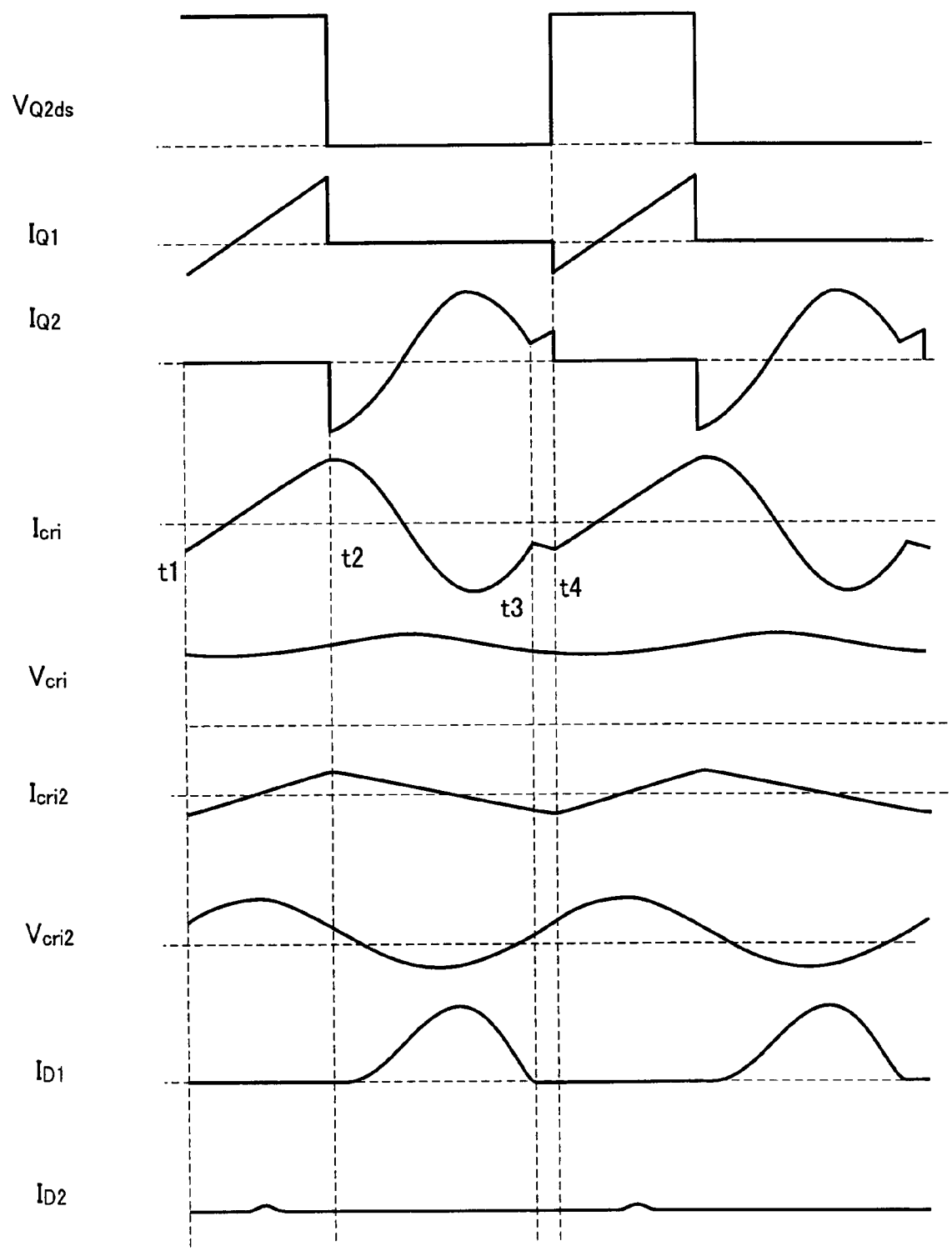
FIG. 23 is a waveform diagram illustrating operation under light load of the multiple output switching power source apparatus according to the embodiment 9 of the present invention.

In FIGS. 22 and 23, VQ2$ds$ is a drain-source voltage of the second switching element Q2, IQ1 a current passing through a drain of the first switching element Q1, IQ2 a current passing through a drain of the second switching element Q2, Icri a current passing through first current resonant capacitor Cri, Vcri a terminal voltage of the first current resonant capacitor Cri, Icri2 a current passing through the second current resonant capacitor Cri2, Vcir2 a terminal voltage of the second current resonant capacitor Cri2, ID1 a current passing through the diode D1, and ID2 a current passing through the diode D2.

Control of the first output voltage Vo1 is carried out, like the multiple output switching power source apparatus of the related art, by controlling duties of the first switching element Q1 and second switching element Q2. Namely, by changing the ON-period duty ratios of the first switching element Q1 and second switching element Q2, a voltage stored in the first current resonant capacitor Cri during an ON period of the first switching element Q1 is adjusted, and in an ON period of the second switching element Q2, energy accumulated in the first current resonant capacitor Cri makes the first resonant reactor Lr and first current resonant capacitor Cri resonate. As a result, a resonant current passes to transmit energy to the secondary side of the first transformer T1A, and therefore, it is possible to control the energy to be transmitted to the secondary side. A voltage generated by the secondary winding S1 is rectified and smoothed by the first rectifying-smoothing circuit consisting of the diode D1 and smoothing capacitor C1, to output the first output voltage Vo1 from the first output terminal.

Control of the second output voltage Vo2 will be explained. In an ON period (for example, time t2 to t4) of the second switching element Q2, a differential voltage between the sum of an input voltage and a voltage of the second resonant capacitor Cri2 and a voltage of the first current resonant capacitor Cri is applied to the primary winding P2 of the second transformer T1B and the second resonant reactor Lri2, second resonant capacitor Cri2, and first resonant capacitor Cri produce a resonant current to be transmitted to the secondary side of the second transformer T1B. The transmitted current is rectified and smoothed through the second rectifying-smoothing circuit having the diode D2 and smoothing capacitor C2, to output the second output voltage Vo2 from the second output terminal. At this time, the second current resonant capacitor Cri2 discharges the voltage corresponding to the accumulated energy, and thereafter, is reversely charged by a differential voltage between the input voltage and the voltage of the first resonant capacitor Cri. During this operation, the second switching element Q2 turns off and the first switching element Q1 turns on, so that the voltage stored in the first resonant capacitor Cri is applied to the second series resonant circuit. Due to the resonant operation of the second series resonant circuit, the first resonant capacitor Cri continues an reverse charging operation. Thereafter, the resonant current of the second series resonant circuit inverts to resume the above-mentioned forward charging operation to accumulate energy in the second resonant capacitor Cri2.

In this case, a charging period of the second current resonant capacitor Cri2 is determined by an ON period of the first switching element Q1 and an ON period of the second switching element Q2. The ON period of the first switching element Q1 is controlled to achieve duties that may keep the first output voltage Vo1 constant. Accordingly, by controlling the ON period of the second switching element Q2, a switching frequency of the second switching element Q2 can be changed to change energy to be accumulated in the second current resonant capacitor Cri2 and thereby control the second output voltage Vo2. Namely, according to the second voltage error signal sent from the feedback circuit 6, the control circuit 10a changes the ON period, i.e., switching frequency of the second switching element Q2, thereby controlling the second output voltage Vo2 output from the second output terminal.

As illustrated in FIG. 22, the waveforms under heavy load indicate that the ON period of the switching element Q2 is long, the amplitude of the second resonant capacitor Cri2 is large, and energy transmitted to the secondary side is large. As illustrated in FIG. 23, the waveforms under light load indicate that the ON period of the switching element Q2 is short, the amplitude of the second resonant capacitor Cri2 is small, and energy transmitted to the secondary side is restricted. At this time, the ON period of the switching element Q1 changes to maintain the first output voltage Vo1 at a constant value according to changes in the ON period of the switching element Q2, and therefore, is controlled substantially at a constant duty.

The multiple output switching power source apparatus according to this embodiment controls an ON period of the second switching element Q2 with the second voltage error signal based on the second output voltage Vo2 and controls an ON period of the first switching element Q1 with the first voltage error signal based on the first output voltage Vo1. It is noted that the same result will be obtained by controlling an ON period of the second switching element Q2 with the first voltage error signal based on the first output voltage Vo1 and controlling an ON period of the first switching element Q1 with the second voltage error signal based on the second output voltage Vo2.

Embodiment 10

Figure 24:
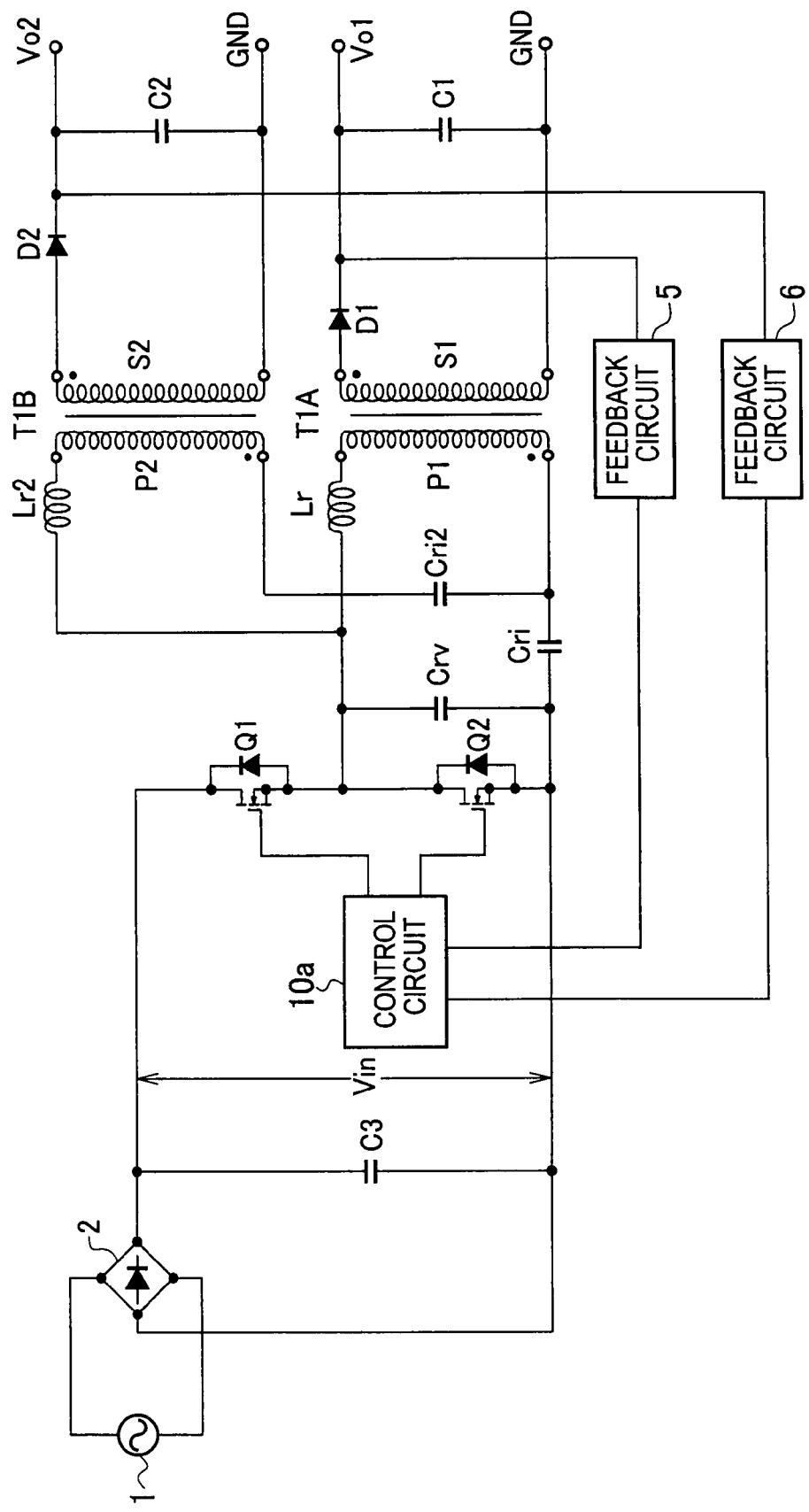
FIG. 24 is a circuit diagram illustrating the configuration of a multiple output switching power source apparatus according to an embodiment 10 of the present invention.

FIG. 24 is a circuit diagram illustrating the configuration of a multiple output switching power source apparatus according to the embodiment 10 of the present invention. The multiple output switching power source apparatus of FIG. 24 differs from the multiple output switching power source apparatus of the embodiment 9 of FIG. 21 in that a secondary winding of a second transformer T1B is wound to generate a voltage whose phase is opposite to the phase of a voltage of a primary winding P2. The remaining part thereof is similar to the embodiment 9.

Figure 25:
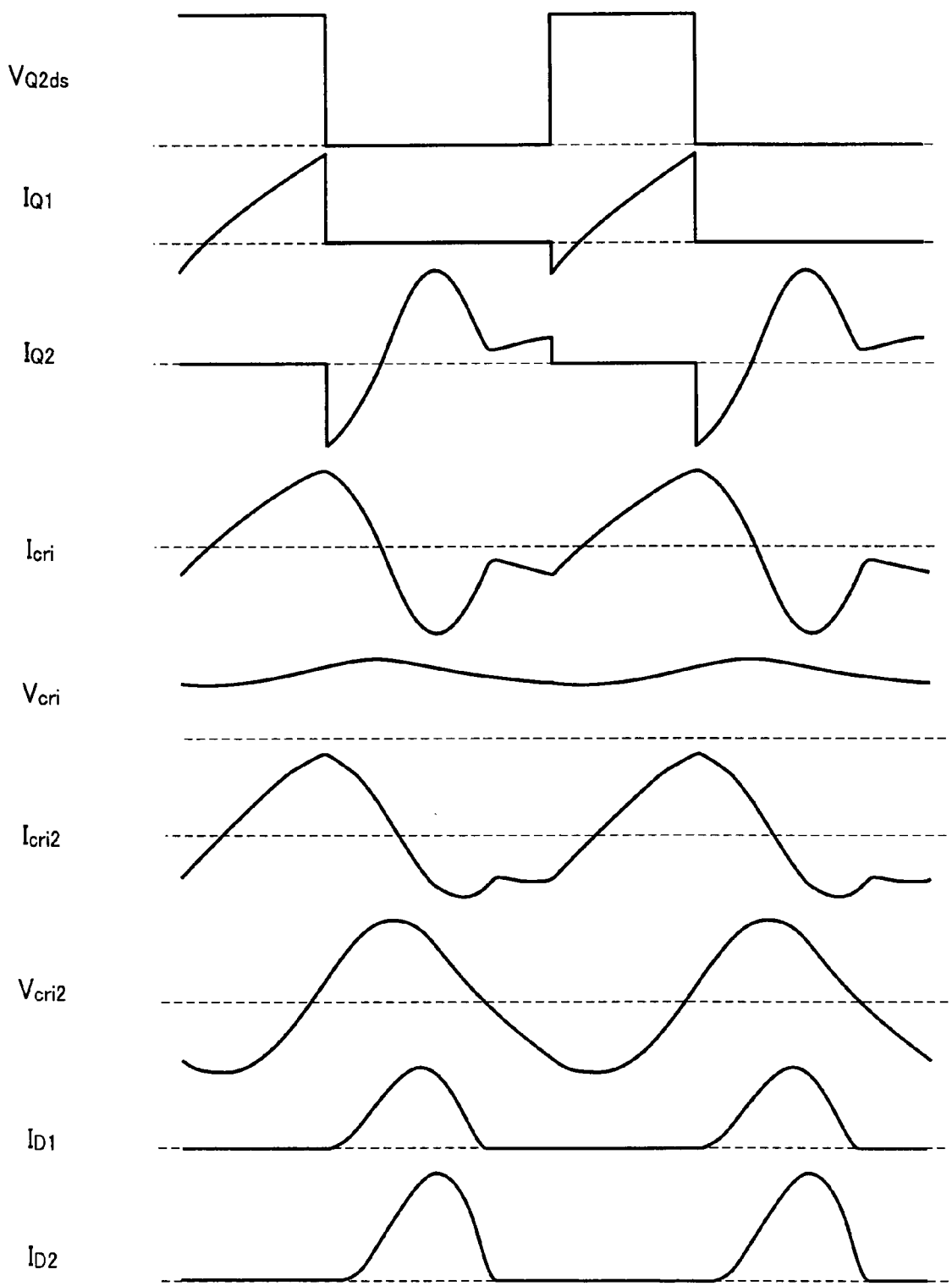
FIG. 25 is a waveform diagram illustrating operation under heavy load of the multiple output switching power source apparatus according to the embodiment 10 of the present invention.
Figure 26:
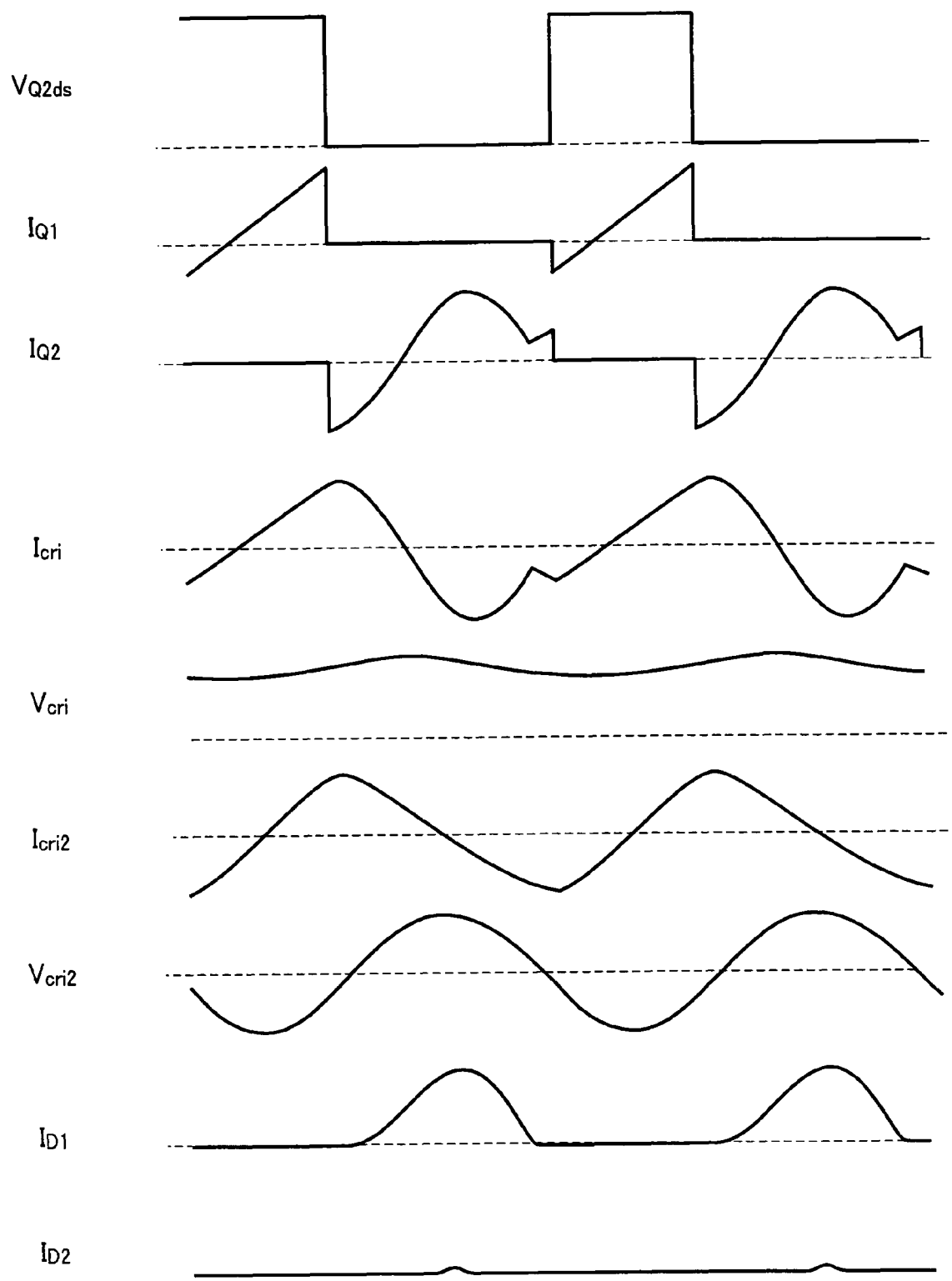
FIG. 26 is a waveform diagram illustrating operation under light load of the multiple output switching power source apparatus according to the embodiment 10 of the present invention.

Operation of the multiple output switching power source apparatus according to the embodiment 10 of the present invention having such a configuration will be explained with reference to waveforms illustrated in FIGS. 25 and 26. FIG. 25 illustrates operational waveforms under heavy load on first and second outputs and FIG. 26 illustrates operational waveforms under light load on the second output.

Control of a first output voltage Vo1 is carried out, like the multiple output switching power source apparatus of the related art, by controlling the duties of a first switching element Q1 and a second switching element Q2. Namely, by changing the duty ratios of the first switching element Q1 and second switching element Q2, a voltage stored in a first current resonant capacitor Cri during an ON period of the first switching element Q1 is adjusted, and in an ON period of the second switching element Q2, energy accumulated in the first current resonant capacitor Cri makes a first resonant reactor Lr and the first current resonant capacitor Cri resonate. As a result, a resonant current passes to transmit energy to the secondary side, and therefore, it is possible to control the energy to be transmitted to the secondary side. A voltage generated by a secondary winding S1 is rectified and smoothed by a first rectifying-smoothing circuit having a diode D1 and smoothing capacitor C1, to output the first output voltage Vo1 from a first output terminal.

Control of a second output voltage Vo2 will be explained. In an ON period (time t1 to t2) of the first switching element Q1, a differential voltage between an input voltage Vin and a terminal voltage of the first current resonant capacitor Cri is applied to a second series resonant circuit consisting of a second current resonant capacitor Cri2 and the primary winding of the second transformer T1B, so that the second series resonant circuit conducts a resonant operation to gradually charge the second current resonant capacitor Cri2.

In an ON period of the switching element Q2, a voltage obtained by adding a voltage of the second resonant capacitor Cri2 to a voltage of the first resonant capacitor Cri is applied to the primary winding of the second transformer T1B and a second resonant reactor Lr2, the second resonant capacitor Cri2, and the first resonant capacitor Cri produce a resonant current, which is transmitted to the secondary side and is rectified and smoothed by a second rectifying-smoothing circuit having a diode D2 and smoothing capacitor C2, to output the second output voltage Vo2 from a second output terminal.

As mentioned above, the first series resonant circuit and second series resonant circuit similarly operate in ON periods of the switching elements Q1 and Q2. It is supposed that, for example, the first resonant reactor Lr1 has an inductance of several $\mu H$, the second resonant reactor Lr2 has an inductance of several tens of $\mu H$, the first resonant capacitor Cri is of several hundreds of $\mu H$, and the second resonant capacitor Cri2 is of several tens of $\mu H$.

In this case, the first resonant capacitor Cri has large capacitance to cause little voltage variation with respect to variations in ON periods of the switching elements Q1 and Q2. In addition, the inductance of the first resonant reactor, i.e., the leakage inductance of the first transformer T1A is small, and therefore, an impedance between the primary and secondary sides of the first transformer T1A is small, so that the voltage of the first resonant capacitor Cri multiplied by a turn ratio is provided to the secondary side. Consequently, controlling the duties of the switching element Q1 and switching element Q2 results in adjusting the voltage of the first resonant capacitor Cri and controlling the first output voltage Vo1.

On the other hand, the second resonant capacitor Cri2 has small capacitance to cause a large voltage variation with respect to variations in ON periods of the switching elements Q1 and Q2. Consequently, changing a frequency corresponding to ON periods of the switching elements Q1 and Q2 results in adjusting the amplitude of the second resonant capacitor Cri2 and controlling the output voltage Vo2.

Due to this, the control circuit 10a changes the ON period, i.e., switching frequency of the second switching element Q2 according to a second voltage error signal sent from a feedback circuit 6 and changes the ON period of the first switching element Q1 according to a first voltage error signal sent from a feedback circuit 5, to adjust the duties of the first switching element Q1 and second switching element Q2 and control the first output voltage Vo1 and second output voltage Vo2 like the embodiment 1.

Embodiment 11

Figure 27:
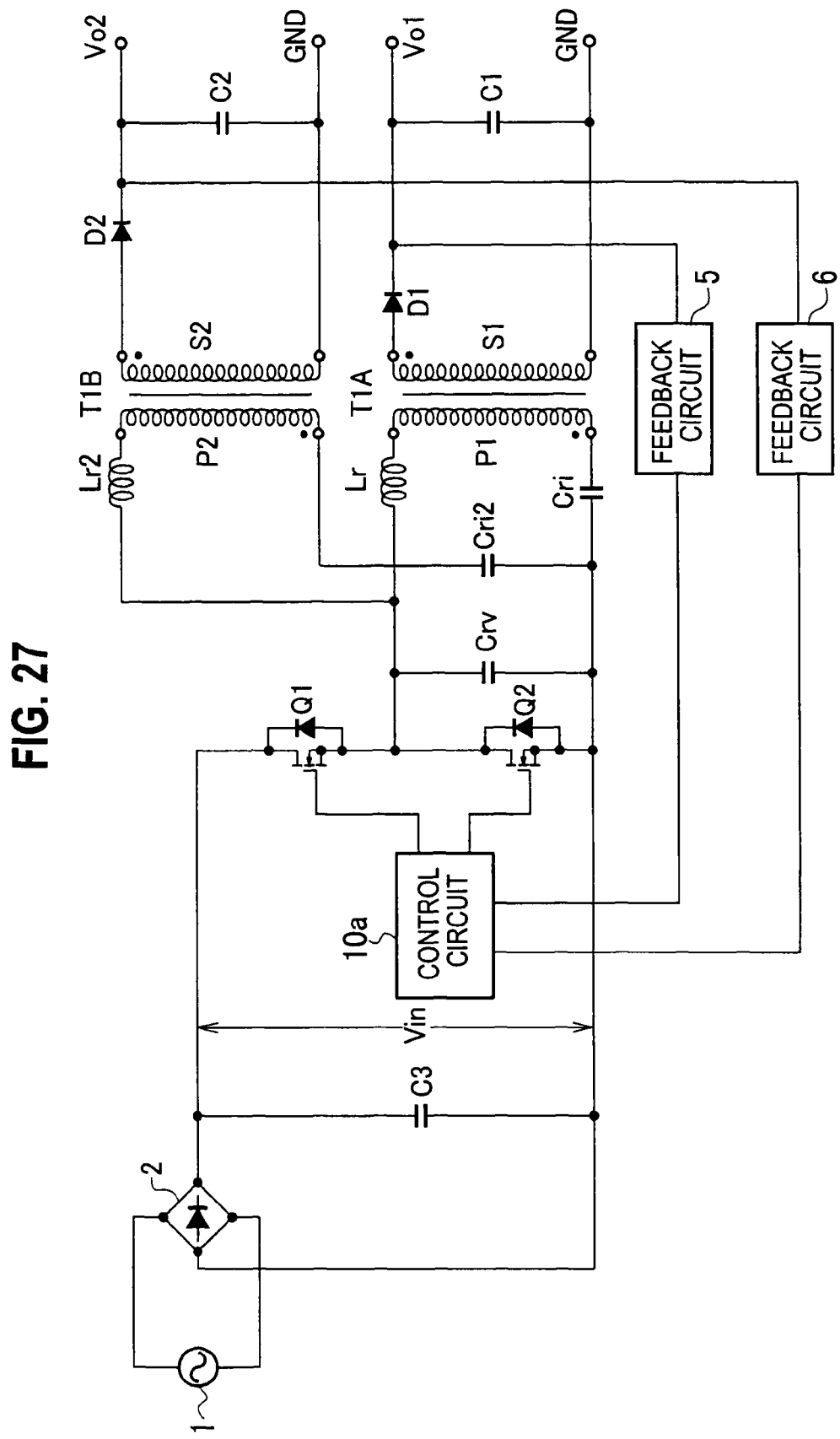
FIG. 27 is a circuit diagram illustrating the configuration of a multiple output switching power source apparatus according to an embodiment 11 of the present invention.

FIG. 27 is a circuit diagram illustrating the configuration of a multiple output switching power source apparatus according to the embodiment 11 of the present invention. This multiple output switching power source apparatus is formed from the multiple output switching power source apparatus according to the embodiment 10 of FIG. 24 by connecting the second resonant capacitor Cri2 connected to a connection point of the first transformer T1A and first resonant capacitor Cri to a connection point of the second switching element Q2 and first resonant capacitor Cri.

Figure 28:
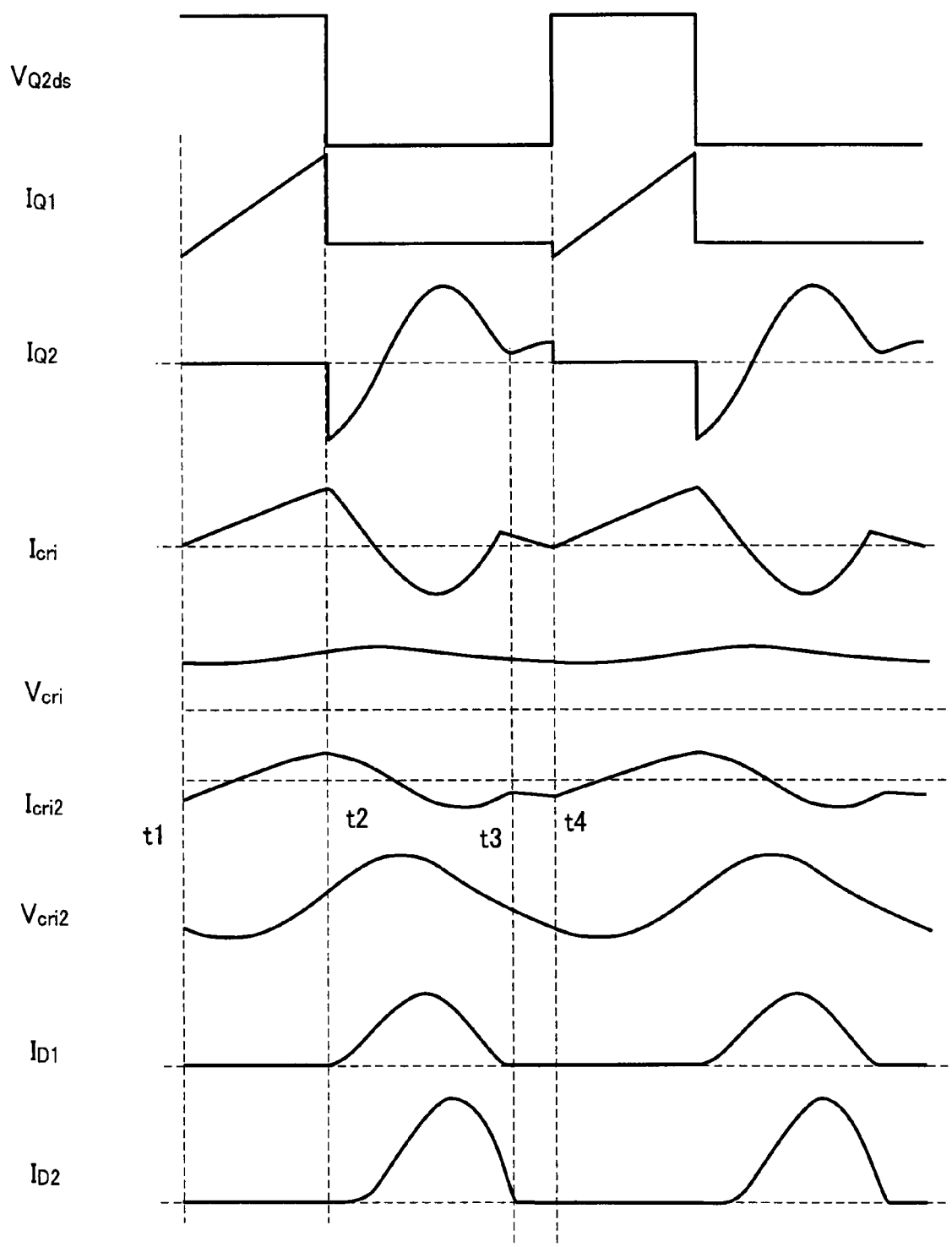
FIG. 28 is a waveform diagram illustrating operation of the multiple output switching power source apparatus according to the embodiment 11 of the present invention.

Operation of the multiple output switching power source apparatus according to the embodiment 11 of the present invention having such a configuration will be explained with reference to waveforms illustrated in FIG. 28.

Control of a first output voltage Vo1 is carried out similar to the multiple output switching power source apparatus of the related art. Control of a second output voltage Vo2 will be explained. In an ON period (time t1 to t2) of a first switching element Q1, an input voltage Vin is applied to a second series resonant circuit having the second current resonant capacitor Cri2 and a primary winding of a second transformer T1B, so that the second series resonant circuit resonates to gradually charge the second current resonant capacitor Cri2.

In an ON period of the switching element Q2, a voltage including a voltage of the second resonant capacitor Cri2 is applied to the primary winding of the second transformer T2B and a second resonant reactor Lr2, the second resonant capacitor Cri2, and the first resonant capacitor Cri produce a resonant current, which is transmitted to the secondary side and is rectified and smoothed by a second rectifying-smoothing circuit having a diode D2 and smoothing capacitor C2, to output the second output voltage Vo2 from a second output terminal.

As mentioned above, this embodiment differs from the multiple output switching power source apparatus of the embodiment 10 only in the voltage applied to the second series resonant circuit in ON periods of the switching elements Q1 and Q2 and conducts a similar operation. Namely, this embodiment conducts control similar to that of the embodiment 10, to control the first output voltage Vo1 and second output voltage Vo2.

The embodiments 9 to 11 rectify and smooth a voltage generated by the secondary winding in an ON period of the switching element Q2, to provide the first output voltage. The same effect will be realized by rectifying and smoothing a voltage generated by the secondary winding in an ON period of the switching element Q1, to provide the first output voltage.

The embodiment 11 rectifies and smoothes a voltage generated by the secondary winding of the second transformer in an ON period of the switching element Q2, to provide the second output voltage. It is noted that the same effect will be realized by rectifying and smoothing a voltage generated by the secondary winding of the second transformer in an ON period of the switching element Q1, to provide the second output voltage.

INDUSTRIAL APPLICABILITY

The multiple output switching power source apparatuses according to the present invention are applicable to power source systems for outputting a plurality of DC voltages having different voltage values.

(The United States Designation)

In connection with designating the United States, this application claims benefit of priority under 35USC §119 to Japanese Patent Applications No. 2005-289934, filed on Oct. 3, 2005, and No. 2006-044321, filed on Feb. 21, 2006, the entire contents of which are incorporated by reference herein.

The invention claimed is:

1. A multiple output switching power source apparatus comprising:
   a first switching element and a second switching element being connected in series between output terminals of a DC power source;
   a first series resonant circuit connected in parallel with the first switching element or the second switching element and having a first current resonant capacitor, a first resonant reactor, and a primary winding of a transformer those are connected in series;
   a first rectifying-smoothing circuit configured to rectify and smooth a voltage generated by a secondary winding of the transformer;
   a second series resonant circuit connected in parallel with the secondary winding of the transformer and having a second current resonant capacitor and a second resonant reactor those are connected in series;
   a second rectifying-smoothing circuit configured to rectify and smooth a voltage of the second series resonant circuit; and
   a control circuit configured to determine an ON period of the first switching element according to a voltage obtained from any one of the first rectifying-smoothing circuit and second rectifying-smoothing circuit, determine an ON period of the second switching element according to a voltage obtained from the other of the first rectifying-smoothing circuit and second rectifying-smoothing circuit, and alternately turn on/off the first switching element and second switching element.

2. The multiple output switching power source apparatus as set forth in claim 1, wherein:
   the secondary winding of the transformer has a first secondary winding and a second secondary winding;
   the first rectifying-smoothing circuit rectifies and smoothes a voltage generated by the first secondary winding of the transformer; and
   the second series resonant circuit is connected in parallel with the second secondary winding.

3. The multiple output switching power source apparatus as set forth in claim 2, wherein
   the first secondary winding and second secondary winding of the transformer are loosely coupled with each other.

4. The multiple output switching power source apparatus as set forth in claim 1, wherein
   a first reactor is arranged in a line extending along the second series resonant circuit and the second rectifying-smoothing circuit.

5. The multiple output switching power source apparatus as set forth in claim 1, further comprising
   a second transformer having a primary winding and a secondary winding, the second resonant reactor of the second series resonant circuit having the primary winding of the second transformer, the second rectifying-smoothing circuit rectifying and smoothing a voltage generated by the secondary winding of the second transformer.

6. The multiple output switching power source apparatus as set forth in claim 5, wherein
   the primary winding and secondary winding of the second transformer are loosely coupled with each other.

7. The multiple output switching power source apparatus as set forth in claim 1, further comprising
   a second transformer having a plurality of secondary windings,
   the second reactor being included in a primary winding of the second transformer, wherein the second rectifying-smoothing circuit rectifies and smoothes voltages generated by the plurality of secondary windings of the second transformer.

8. The multiple output switching power source apparatus as set forth in claim 7, wherein:
the secondary winding of the first transformer has a first secondary winding and a second secondary winding;
the first rectifying-smoothing circuit rectifies and smoothes a voltage generated by the first secondary winding of the first transformer; and
the second series resonant circuit is connected in parallel with the second secondary winding of the first transformer.

9. The multiple output switching power source apparatus as set forth in claim 7, wherein:
the plurality of secondary windings of the second transformer include a first secondary winding and a second secondary winding being connected in series with the first secondary winding; and
the second rectifying-smoothing circuit has a smoothing capacitor whose first end is connected to a connection point of a first end of the first secondary winding and a first end of the second secondary winding, a first diode connected to a second end of the first secondary winding and a second end of the smoothing capacitor, and a second diode connected to a second end of the second secondary winding and the second end of the smoothing capacitor.

10. A multiple output switching power source apparatus comprising:
a first switching element and a second switching element being connected in series between output terminals of a DC power source;
a first series resonant circuit having a first current resonant capacitor, a first resonant reactor, and a primary winding of a first transformer those being connected in series, the first series resonant circuit being connected in parallel with the first switching element or the second switching element;
a second series resonant circuit having a second current resonant capacitor, a second resonant reactor, and a primary winding of a second transformer those being connected in series, the second series resonant circuit being connected in parallel with the first series resonant circuit;
a first rectifying-smoothing circuit configured to rectify and smooth a voltage generated by a secondary winding of the first transformer;
a second rectifying-smoothing circuit configured to rectify and smooth a voltage generated by a secondary winding of the second transformer; and
a control circuit configured to determine an ON period of the first switching element according to a voltage obtained from any one of the first rectifying-smoothing circuit and second rectifying-smoothing circuit, determine an ON period of the second switching element according to a voltage obtained from the other of the first rectifying-smoothing circuit and second rectifying-smoothing circuit, and alternately turn on/off the first switching element and second switching element.

11. The multiple output switching power source apparatus as set forth in claim 10, wherein
the second series resonant circuit is connected in parallel with a series circuit including the first resonant reactor and the primary winding of the first transformer.

12. The multiple output switching power source apparatus as set forth in claim 10, wherein
the first resonant reactor and second resonant reactor are leakage inductances of the first transformer and second transformer, respectively.

13. The multiple output switching power source apparatus as set forth in claim 10, wherein:
the secondary winding of the first transformer is wound in a direction in a manner as to generate a voltage to be rectified by the first rectifying-smoothing circuit in an ON period of one of the first switching element and second switching element; and
the secondary winding of the second transformer is wound in a direction in a manner as to generate a voltage to be rectified by the second rectifying-smoothing circuit in an ON period of the other of the first switching element and second switching element.

14. The multiple output switching power source apparatus as set forth in claim 10, wherein:
the secondary winding of the first transformer is wound in a direction in a manner as to generate a voltage to be rectified by the first rectifying-smoothing circuit in an ON period of one of the first switching element and second switching element; and
the secondary winding of the second transformer is wound in a direction in a manner as to generate a voltage to be rectified by the second rectifying-smoothing circuit in the ON period.

* * * * *